(12) United States Patent
Dimmer et al.

(10) Patent No.: US 8,826,827 B1
(45) Date of Patent: Sep. 9, 2014

(54) RAIL CAR COVER SYSTEM

(75) Inventors: Jerry R. Dimmer, Yankton, SD (US);
David J. Schaefer, Yankton, SD (US);
Troy Knouse, Yankton, SD (US); Steven J. Knight, Mission Hill, SD (US);
Nathan P. Dimmer, Yankton, SD (US);
Kevin J. Kleinsasser, Huron, SD (US)

(73) Assignee: Strategic Rail Systems Company, Yankton, SD (US)

( * ) Notice: Subject to any disclaimer, the term of this patent is extended or adjusted under 35 U.S.C. 154(b) by 102 days.

(21) Appl. No.: 13/447,412

(22) Filed: Apr. 16, 2012

Related U.S. Application Data

(63) Continuation-in-part of application No. 13/074,641, filed on Mar. 29, 2011, now Pat. No. 8,631,746.

(60) Provisional application No. 61/318,658, filed on Mar. 29, 2010.

(51) Int. Cl.
*B61D 39/00* (2006.01)

(52) U.S. Cl.
USPC .................................. 105/377.06; 105/377.01

(58) Field of Classification Search
USPC ........... 105/377.01–377.06; 296/225, 100.01, 296/100.02, 100.05, 100.06, 210
See application file for complete search history.

(56) References Cited

U.S. PATENT DOCUMENTS

| | | | | |
|---|---|---|---|---|
| 1,847,132 A | * | 3/1932 | Morrow | 105/377.05 |
| 3,009,426 A | * | 11/1961 | Nampa | 410/47 |
| 3,169,492 A | * | 2/1965 | Stiefel et al. | 105/377.05 |
| 3,503,341 A | * | 3/1970 | Widell et al. | 105/377.11 |
| 3,736,883 A | * | 6/1973 | Yang et al. | 105/377.05 |
| 4,613,174 A | * | 9/1986 | Berg et al. | 292/136 |
| 4,767,152 A | * | 8/1988 | Stluka et al. | 296/100.1 |
| 5,311,824 A | * | 5/1994 | Sauer et al. | 105/377.01 |
| 5,429,399 A | * | 7/1995 | Geringer et al. | 292/92 |
| 5,487,584 A | * | 1/1996 | Jespersen | 296/100.18 |
| 5,664,824 A | * | 9/1997 | Stephens et al. | 296/100.17 |
| 6,352,036 B1 | * | 3/2002 | Early | 105/377.06 |
| 6,758,504 B2 | * | 7/2004 | Mandall | 292/251.5 |
| 6,983,975 B2 | * | 1/2006 | Morrow | 296/100.1 |
| 7,003,850 B2 | * | 2/2006 | Gaydos et al. | 16/235 |
| 7,147,264 B2 | * | 12/2006 | Morrow | 296/100.1 |
| 7,823,515 B2 | * | 11/2010 | Schaefer et al. | 105/377.02 |
| 7,878,124 B2 | * | 2/2011 | Low et al. | 105/377.05 |
| 7,967,363 B2 | * | 6/2011 | Schaefer et al. | 296/100.06 |
| 8,205,387 B2 | * | 6/2012 | Ranaudo et al. | 49/141 |
| 8,256,355 B2 | * | 9/2012 | Dial et al. | 105/377.05 |
| 2008/0236439 A1 | * | 10/2008 | Low et al. | 105/377.05 |
| 2009/0260538 A1 | * | 10/2009 | McCallum et al. | 105/377.11 |
| 2010/0037798 A1 | * | 2/2010 | Schaefer et al. | 105/377.02 |
| 2010/0326318 A1 | * | 12/2010 | Baranowski et al. | 105/377.01 |

(Continued)

*Primary Examiner* — Jason C Smith
(74) *Attorney, Agent, or Firm* — Dicke, Billig & Czaja, PLLC

(57) ABSTRACT

A rail car cover system including a rail car and a first cover section. The rail car has an opening. The first cover section is operably attached to the rail car. The first cover section includes a first corner hinge assembly, a second corner hinge assembly and a first cover material. The first corner hinge assembly is pivotally mounted to the rail car. The second corner hinge assembly is pivotally mounted to the rail car. At least a portion of the second corner hinge assembly is slidable away from the first corner hinge assembly. The first cover material is operably attached to the first corner hinge assembly and the second corner hinge assembly.

30 Claims, 17 Drawing Sheets

(56) References Cited

U.S. PATENT DOCUMENTS

2011/0030575 A1* 2/2011 Schaefer et al. ......... 105/377.02
2011/0265684 A1* 11/2011 Knight et al. ............ 105/377.06
2012/0144748 A1* 6/2012 Ranaudo et al. ................ 49/260

* cited by examiner

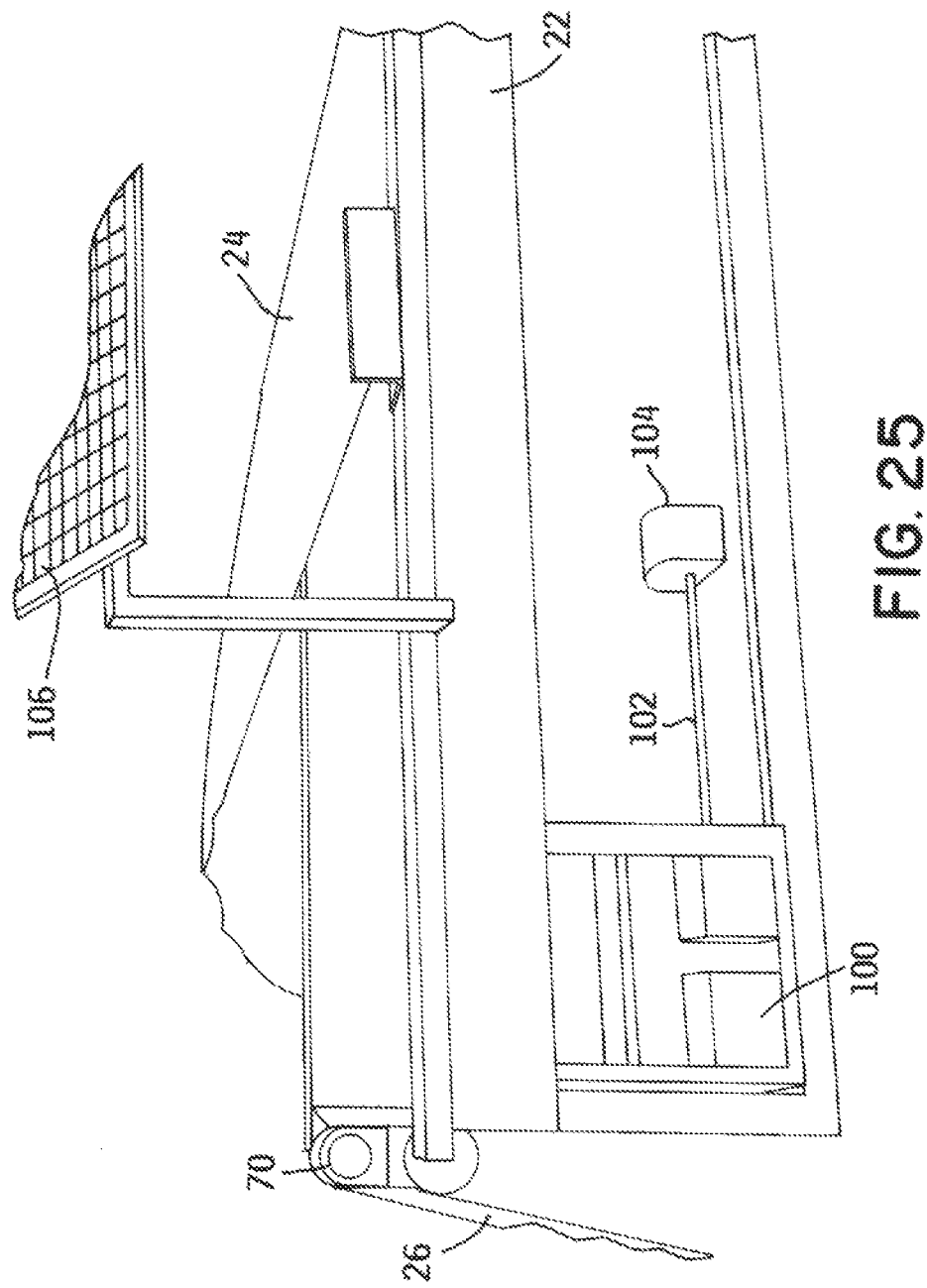

RAIL CAR COVER SYSTEM

REFERENCE TO RELATED APPLICATION

This application is a continuation-in-part of U.S. application Ser. No. 13/074,641, which was filed on Mar. 29, 2011, which claims priority to U.S. Provisional Application No. 61/318,658, which was filed on Mar. 29, 2010, the contents of which are incorporated herein by reference.

FIELD OF THE INVENTION

The invention relates generally to enclosures for vehicles. More particularly, the invention relates to enclosures for rail cars.

BACKGROUND OF THE INVENTION

When transporting relatively large quantities of many types of products, it is typically more cost effective to transport the products in bulk where the products are placed into the vehicle that is utilized to transport the product.

Depending on various factors such as the quantity of products being shipped and the distance over which the products are being shipped, the products may be transported in a rail car, a truck or a trailer. To facilitate placing the product into and/or out of the transport vehicle, the transport vehicle may include an open top.

When transporting various types of products in open top vehicles, it is possible for air movement over the product to cause a portion of the product to be blown out of the transport vehicle. Even when a relatively small portion of material is blown out of the transport vehicle, this lost material may pose problems.

For example, when coal is being hauled in open top rail cars, relatively small coal particles or dust may be blown out of the rail cars from the flow of air over the coal as the rail cars move as well as from ambient winds. Even though the amount of coal that is blown out of a particular rail car may be relatively small, the rail cars are typically moved in relatively long trains that may each have over 100 rail cars, which may cause a significant amount of coal dust to accumulate. In addition, in certain areas, many trains may travel through the same area numerous times each day, which could result in significant accumulation of the material blown out of the rail car over extended periods of time.

When the coal particles accumulate proximate to the railroad tracks over which the trains pass, the quality of the rail bed may be degraded. For example, the ability of the rail bed to properly drain water from rain or melting snow is diminished which can lead to the saturation of the rail bed and subsoil beneath the tracks. This water saturation could lead to potentially dangerous situations such as derailment of rail cars.

There have been various attempts to reduce coal particles escaping from the rail cars and contaminating the roadbed and the surrounding environment. Unfortunately, there are numerous barriers that exclude the use of a tarp or previously known mechanical closures. One such challenge is that in some locations coal is loaded and unloaded from rail cars while the rail cars are moving. Another challenge is that in other locations rail cars are completely inverted during the unloading process. The prior rail car cover designs interfere with the use of equipment that is used in conjunction with loading and unloading the rail cars using the preceding mechanisms.

One dust controlling technique involves spraying water on top of the coal. While water initially works well, water tends to evaporate relatively fast because of the air flow over the coal pile as the rail car moves. Additionally, water tends to be in relatively short supply in some areas where coal is mined.

Another technique involves spraying water soluble chemicals over the coal to create a wind resistant crust. While these materials can last much longer than water, they are considerably more expensive than water and must be mixed with water, which can be in relatively short supply in some regions where coal is mined as noted above.

During transit, coal tends to shift which can decrease the effectiveness of the wind resistant crust. There are also potential issues relating to the water soluble materials being compatible with the power plants in which the coal is burned.

It has also been proposed to place a rigid cover over the rail car. Prior to the coal loading or unloading process, the rail car rigid cover is lifted off of the rail car. Once the loading or unloading process is completed, the rail car rigid cover is replaced onto the rail car.

Because of the relatively large size of the rail car rigid cover, there are challenges associated with handling the rail car rigid cover during the coal loading process at the mine and the unloading process at the power plants. Because of the fact that the rail car rigid cover handling equipment may be relatively large and the process cumbersome or in the case of bottom dump unloading it may be possible that the rail car rigid cover can remain in the closed position on the rail car during the dumping process if it has adequate venting capabilities.

SUMMARY OF THE INVENTION

An embodiment of the invention is directed to a rail car cover system that includes a rail car and a first cover section. The rail car has an opening. The first cover section is operably attached to the rail car.

The first cover section includes a first corner hinge assembly, a second corner hinge assembly and a first cover material. The first corner hinge assembly and the second corner hinge assembly are pivotally mounted to the rail car. At least a portion of the second corner hinge assembly is slidable away from the first corner hinge assembly. The first cover material is operably attached to the first corner hinge assembly and the second corner hinge assembly.

Another embodiment of the invention is direct to a rail car cover system that includes a rail car and a first cover section. The rail car has an opening. The first cover section is operably attached to the rail car.

The first cover section includes a first corner hinge assembly, a second corner hinge assembly, at least one intermediate arm assembly and a first cover material. The first corner hinge assembly and the second corner hinge assembly are pivotally mounted to the rail car.

The at least one intermediate arm assembly pivotally is mounted to the rail car intermediate the first corner hinge assembly and the second corner hinge assembly. At least a portion of the at least one intermediate arm assembly is slidable away from the first corner hinge assembly. The first cover material is operably attached to the first corner hinge assembly, the second corner hinge assembly and the at least one intermediate arm assembly.

Another embodiment of the invention is directed to a rail car cover system that includes a rail car, a first cover section, a first cover movement mechanism and a first cover position sensing mechanism. The rail car has an opening. The first cover section is operably attached to the rail car.

The first cover movement mechanism is operably attached to the first cover section. The first cover movement mechanism is capable of moving the first cover section between an open configuration and a closed configuration.

The first cover position sensing mechanism is operably connected to the first cover movement mechanism to turn off the first cover movement mechanism when the first cover section is in at least one of the open configuration and the closed configuration.

Another embodiment of the invention is directed to a method of covering a rail car. A rail car having an opening is provided. A first cover section is operably attached to the rail car.

The first cover section includes a first corner hinge assembly, a second corner hinge assembly and a first cover material. The first corner hinge assembly and the second corner hinge assembly are pivotally mounted to the rail car. The first cover material is operably attached to the first corner hinge assembly and the second corner hinge assembly.

At least a portion of the second corner hinge assembly slides away from the first corner hinge assembly. The first cover section is pivoted to an open configuration. A product is placed into the rail car. The first cover section is pivoted to a closed configuration where the opening is substantially covered.

Another embodiment of the invention is directed to a method of covering a rail car. A rail car having an opening is provided. A first cover section is operably attached to the rail car. A first cover movement mechanism is used to move the first cover section between an open configuration and a closed configuration.

A position of the first cover portion is sensed with a first cover position sensing mechanism. The first cover movement mechanism is turned off when the first cover section is in at least one of the open configuration and the closed configuration.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 25 is an end view of the rail car cover system.

DETAILED DESCRIPTION OF THE PREFERRED EMBODIMENTS

Figure 1:
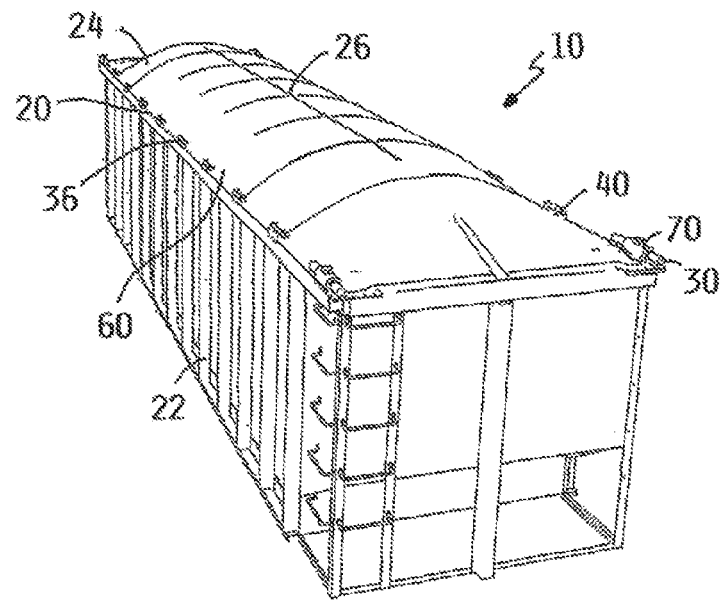
FIG. 1 is a perspective view of a rail car cover system according to an embodiment of the invention where the rail car cover system is in a closed configuration.
Figure 2:
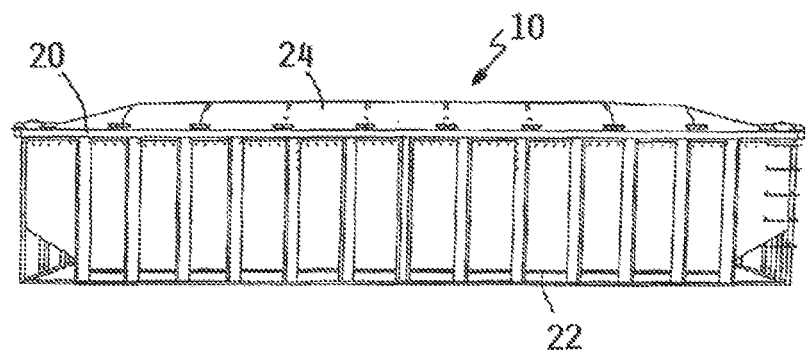
FIG. 2 is a side view of the rail car cover system in the closed configuration.

An embodiment of the invention is directed to a rail car cover system for an open top vehicle such as a rail car, as illustrated at 10 in the figures. The rail car cover system 10 substantially covers an upper end 20 of a rail car 22 when in the closed configuration.

The rail car cover system 10 may include three main components—a cover, an opening system and a control system. Each of these components work together to cause the rail car cover system 10 to move between the closed position and the open position.

The rail car 22 does not illustrate wheel assemblies because a variety of types of wheel assemblies such as are suited for use on rails or conventional roads may be used in conjunction with the rail car cover system 10 of the current invention.

One advantage of the rail car cover system 10 is that the rail car cover system 10 provides near complete coal dust mitigation in a highly reliable manner. While the concepts of the invention are particularly suited for use in conjunction with rail cars 22 that carry coal, a person of skill in the art will appreciate that other materials may be transported in the rail car 22. An example of one such alternative material is grain, which is more susceptible to being blown out of an uncovered top on the rail car 22 as well as being more susceptible to damage caused by precipitation. The rail car cover system 10 can be adapted for use in conjunction with rail cars 22 having a variety of heights, lengths and widths.

Another advantage of the rail car cover system 10 is that it enhances the aerodynamics of the rail car 22, which may be more important when the rail car 22 is moving empty. Using the rail car cover system 10 in conjunction with the rail car 22 could thereby enhance the fuel efficiency of the train. In certain embodiments, the increase in the fuel efficiency of the train may be up to about 20 percent.

Yet another advantage of the rail car cover system 10 is that it reduces the potential of precipitation entering the rail car 22 and thereby affecting the ability to unload the coal from the rail car 22. For example, water that enters the coal pile and then freezes because of low ambient temperatures could cause the coal pile to solidify. When this occurs it is typically necessary to heat the rail car 22 before it is possible to unload the coal from the rail car 22.

In certain embodiments, the rail car cover system 10 includes a first cover section 24 and a second cover section 26. The first cover section 24 and the second cover section 26 are operably attached to opposite sides of the rail car 22. In certain embodiments, the first cover section 24 and the second cover section 26 may have a substantially identical configuration.

In other embodiments, the rail car cover system 10 may include a single cover section of different sizes. It is also possible to fabricate the rail car cover system 10 having a length and a width that is less than the length and/or width of the rail car 22 to which it is attached.

Figure 4:
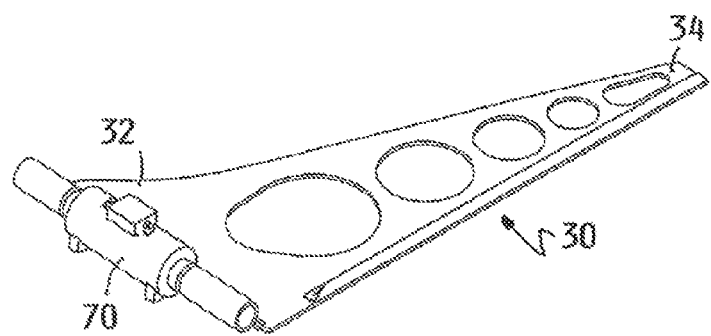
FIG. 4 is a perspective view of a corner hinge assembly for the rail car cover system.

The first cover section 24 and the second cover section 26 may each have at least one corner hinge assembly 30, as illustrated in FIG. 4, and a cover material 60 that is attached thereto. While the corner hinge assembly 30 may be substantially flat, forming the corner hinge assembly 30 with other configurations such as a U-shape cross-section may enhance the strength of the corner hinge assembly 30. However, the corner hinge assembly 30 should be relatively flat to allow the rail car 22 to slide into a relatively small clearance between the rail car 22 and a spill girder of a rotary dumper (not shown).

The corner hinge assembly 30 may have a substantially linear configuration so that the corner hinge assembly may be substantially adjacent to an upper surface on the end of the rail car 22 in the closed position. This configuration restricts air from flowing under the cover system 10 when the rail car 22 is moving.

The corner hinge assembly 30 may be substantially adjacent to the outer surface of the side of the rail car 22 in the open position. This configuration allows either cover section 24, 26 to slide into a relatively small clearance between the spill girder and the side of the rail car 22 as the rail car 22 enters a barrel of the rotary dumping mechanism. The corner hinge assembly 30 may be fabricated from a rigid material such as steel that resists deformation and bending.

In certain embodiments, the corner hinge assembly 30 may be operably attached to a side of the rail car 22 proximate an upper edge thereof using a hinge mechanism 36. As is described in more detail below, the hinge mechanism 36 may enable the corner hinge assembly 30 to pivot over a range of more than 180° and, in certain embodiments, up to about 270° such that the corner hinge assembly 30 may be in a generally horizontal position for covering the rail car 22 as well as in a generally vertical position where the corner hinge assembly 30 is adjacent to a side of the rail car 22 to facilitate loading and/or unloading of the rail car 22.

In certain embodiments, the corner hinge assembly 30 may have a width that is greater proximate a proximal end 32 than proximate a distal end 34. Forming the corner hinge assembly 30 with this shape may compensate for the greater forces that are placed on the corner hinge assembly 30 proximate the proximal end 32.

The geometry of the corner hinge assembly 30 may be such that its axis is skewed. This configuration allows the end arms to be plumb and perpendicular in the open position, which ensures that the cover 10 will be flat and flush against the outside of the rail car. As the corner hinge assemblies 30 rotate to the closed position, the corner hinge assemblies 30 may be configured to angle in slightly allowing the taut cover to follow the contours of the coal pile down the center of the rail car 22 while remaining straight along the hinge line.

The corner hinge assembly 30 may include an offset lower end that facilitates attachment of the corner hinge assembly 30 to the rivet line on the rail car 22. Attachment at the rivet line may be required by the owner and/or manufacturer of the rail car 22 to avoid voiding the warranty on the rail car 22.

While it is possible to connect the hinges 36 together that extend along the length of the rail car 22, an advantage of not connecting the hinges is that the hinges may pivot at different rates such as in response to a force being placed on one of the hinge assemblies.

Using separate hinges 36 also allows for more axial misalignment on rail cars that may not be straight. Separate hinges 36 allow for different amounts of linear axial movement of the cover due to tensioning and thermal expansion.

To prevent damage to the cover material 60 caused by up and down movement of the cover material 60 as the rail car 22 is moving, the cover material 60 should be maintained in a relatively taut configuration. During use of the rail car 22, it is possible for the cover material 60 to stretch. Such stretching could reduce the tautness of the cover material 60. The tautness of the cover material could also be affected by changes in the dimensions of the rail car 22 such as when the rail car 22 is full of product or empty.

Figure 5:
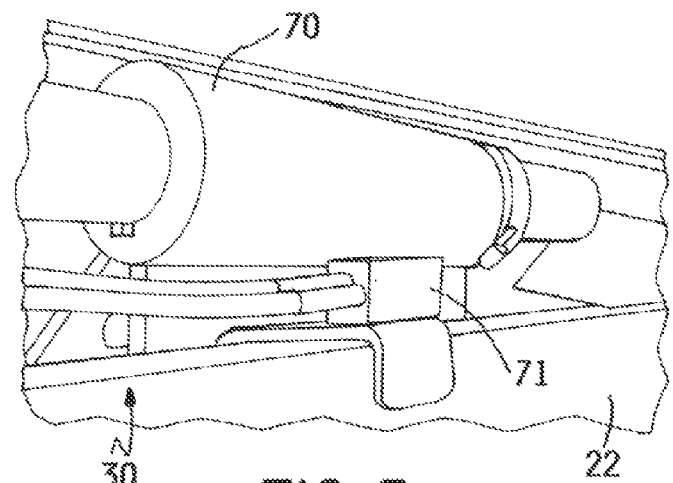
FIG. 5 is an outer perspective view of the corner hinge assembly attached to the rail car.
Figure 6:
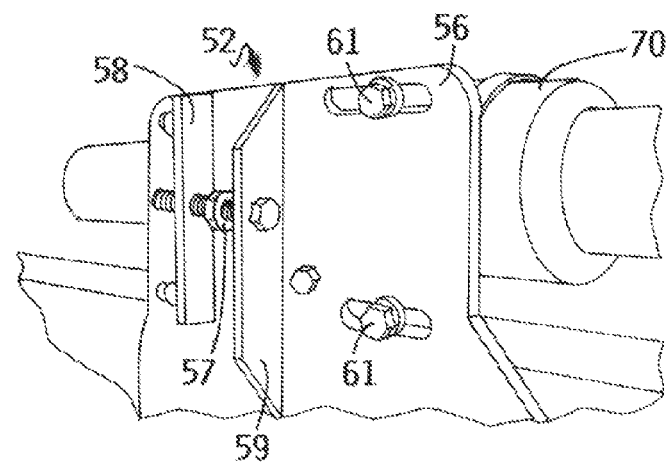
FIG. 6 is an inner perspective view of the cover hinge assembly attached to the rail car.

At least one of the corner hinge assemblies 30 may include an adjustment mechanism 52, as illustrated in FIGS. 5 and 6. The adjustment mechanism 52 includes a first adjustment portion 58 and a second adjustment portion 56 that are slidable with respect to each other.

The first adjustment portion 58 is integrally attached to the actuator 70 and the other components of the corner hinge assembly 30. The second adjustment portion 56 is mounted to the rail car 22.

The position of the first adjustment portion 58 with respect to the second adjustment portion 56 may be controlled by a screw 57 or other mechanism that causes the first adjustment portion 58 to slide with respect to the second adjustment portion 56. In one such configuration, the screw 57 operably engages the first adjustment portion 58 that extends generally transverse to the actuator 70 and a plate 59 that is attached to and extends generally transverse to the second adjustment portion 56.

Once the screw 57 is adjusted to provide the cover material 60 with a desired level of tautness, bolts 61 may be tightened to retain the first adjustment portion 58 in a stationary position with respect to the second adjustment portion 56.

In other embodiments, it is possible to adjust the position of the first adjustment portion 58 with respect to the second adjustment portion 56 with other mechanisms such as a hydraulic or pneumatic mechanism (not shown). While such alternative configurations could enable the tautness of the cover material 60 to be automatically adjusted, these types of systems would require a power supply to be provided thereto.

Figure 7:
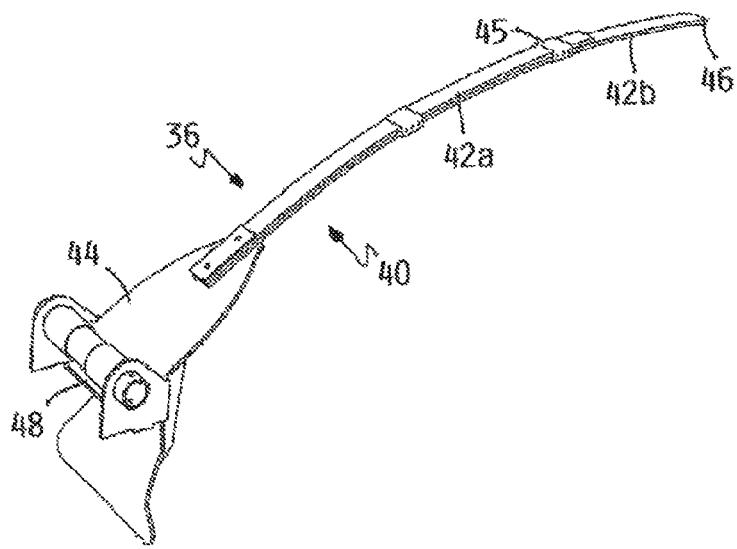
FIG. 7 is a perspective view of an intermediate hinge assembly for the rail car cover system.

At least one intermediate hinge assembly 36 may also be provided, as illustrated in FIG. 7. In certain embodiments, 2-10 intermediate hinge assemblies 36 are utilized on each side of the first cover section 24 and the second cover section 26. In other embodiments, there are about 6 intermediate hinge assemblies 36. Using this quantity of hinges provides the first and second cover sections 24, 26 with support while reducing the instances of flutter.

An angled gusset 38 may be provided on each of the intermediate hinge assemblies 36. In certain embodiments, each of the intermediate hinge assemblies 36 includes two angled gussets 38.

The angled gusset 38 may include an upper gusset surface 39 that is oriented at a non-horizontal angle. The angled gusset 38 may limit the distance to which the intermediate hinge assemblies 36 may pivot when moving to the closed configuration.

The angle of the upper gusset surface 39 may be different at different locations on the rail car 22. The angle may be between 0 and 40 degrees. For example, the angle may gradually increase when moving from the end of the rail car 22 to the center of the rail car 22. This configuration allows the rail car cover system 10 to be more elevated proximate a center of the rail car 22 to accommodate a greater height of the coal pile proximate the center of the rail car 22.

The rib hinges 40 in between the corner hinge assemblies have two functions. The rib hinges 40 support fiberglass ribs that sandwich and support the cover. The rib hinges 40 also allow the whole assembly to rotate with the arms when the rotary actuator is moved between open and closed positions.

The intermediate hinges 36 hold the fiberglass at a slightly higher angle when in the closed position. A first rib hinge from each corner is a transitional hinge 40. The transitional hinge 40 holds the fiberglass at a lower angle in the closed position. This configuration allows the cover to smoothly transition from the arched shape in the middle of the rail car 22 to a flat profile at the end arms. The transitional hinges 40 may have shorter and stiffer fiberglass ribs that allow for less curvature of the cover to thereby transition to the relatively flat end arms.

The intermediate hinges 36 may be formed with different structures on each side of the rail car cover system 10. For example, the ribs on the first cover section 24 that includes the plates 92 may be formed from a thicker material than the ribs on the second cover section 26 that includes the magnets 90. In certain embodiments the ribs on the first cover section 24 have a thickness of about 5/16 of an inch while the ribs on the second cover section 26 have a thickness of about 3/16 of an inch.

Forming the ribs with this configuration enables the first cover section 24 to be more rigid while the second cover section 26 is less rigid. The first cover section 24 is thereby maintained at an elevated position. When the second cover section 26 is lowered, the less rigid ribs enable the second cover section 26 to bend downward in response to the magnetic attraction between the magnets 90 and the plates 92.

The ribs placed on the upper side of the first and second cover sections 24, 26 may be more rigid than the lower ribs. In certain embodiments, the upper ribs have a thickness of about 7/16 of an inch. Since the upper ribs only extend a portion of the length of the lower ribs, the upper ribs enhance the strength of the first and second cover sections 24, 26 while allowing an outer portion of the first and second cover sections 24, 26 to deflect in response to the magnetic attraction.

The fiberglass ribs flexing to convex slope is done to better fit the shape of the coal pile and to provide a smooth transition from one cover side to the other as it arcs over the rail car and to shed precipitation. The convex shape also gives the cover material some structural integrity that allows the cover material to span between adjacent ribs while minimizing sagging.

It is possible for the transitional and intermediate hinge assembly 36, 40 to have a substantially linear configuration or a convex configuration. In addition to increasing the volume of product that may be transported in the rail car, forming the intermediate hinge assembly 36 with a convex configuration may also increase the strength of the intermediate hinge assembly 36.

In certain embodiments, the intermediate hinge assembly 36 is fabricated from a flexible material such as fiberglass 42 that is substantially straight when the cover system 10 is in the open position and is curved to a convex configuration when the cover system 10 is in the closed position.

While it is illustrated that the corner hinge assembly 30 and the intermediate hinge assembly 36 have different shapes, it is possible for the corner hinge assembly 30 and the intermediate hinge assembly 36 to have similar shapes. In certain embodiments, the intermediate and transitional hinge assemblies 36, 40 may have a substantially planar cross section or other shaped profiles.

In certain embodiments, the intermediate hinge assembly 36 may be formed from more than one elongated member 42 that is operably attached together at one or more locations. Additionally, in certain embodiments, the intermediate hinge assembly 36 may have a width that is greater proximate a proximal end 44 than proximate a distal end 46.

In certain embodiments, the intermediate hinge assembly 36 may be operably attached to a side of the rail car 22 proximate an upper edge thereof using a hinge mechanism 48. As is described in more detail below, the hinge mechanism 48 may enable the intermediate hinge assembly 36 to pivot over a range of more than 180° and, in certain embodiments, up to about 270° such that the intermediate hinge assembly 36 may be in a generally horizontal position for covering the rail car 22 as well as in a generally vertical position where the intermediate hinge assembly 36 is adjacent to a side of the rail car 22 to facilitate loading and/or unloading of the rail car 22.

Figure 8:
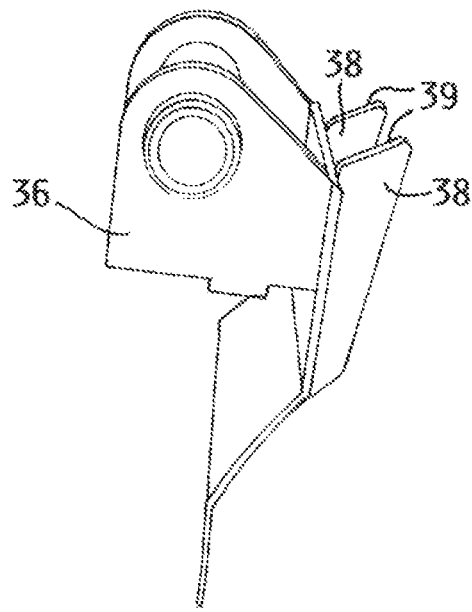
FIG. 8 is a side view of a hinge mechanism for the intermediate hinge assembly.
Figure 9:
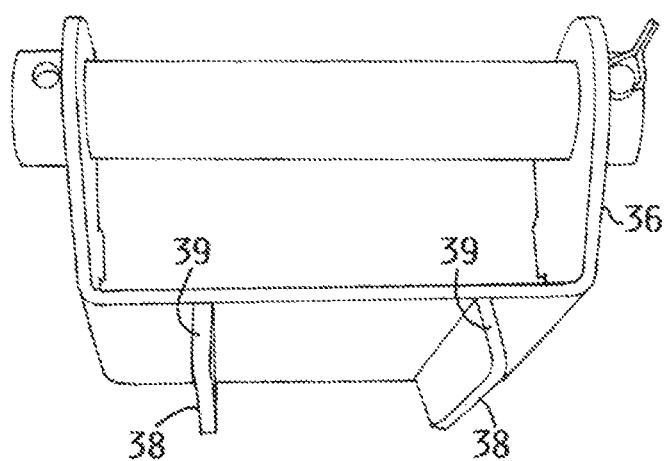
FIG. 9 is a top view of the hinge assembly of FIG. 8.

The hinge mechanism 48 may include an offset lower end, as illustrated in FIGS. 8 and 9, which facilitates attachment of the intermediate hinge assembly 36 to the rivet line on the rail car 22. Attachment at the rivet line may be required by the owner and/or manufacturer of the rail car 22 to avoid potentially weakening the rail car 22 by forming holes in the rail car 22 when attaching the rail car cover system 10 to the rail car 22. Such additional holes are also undesirable because they affect the warranty on the rail car 22.

Figure 10:
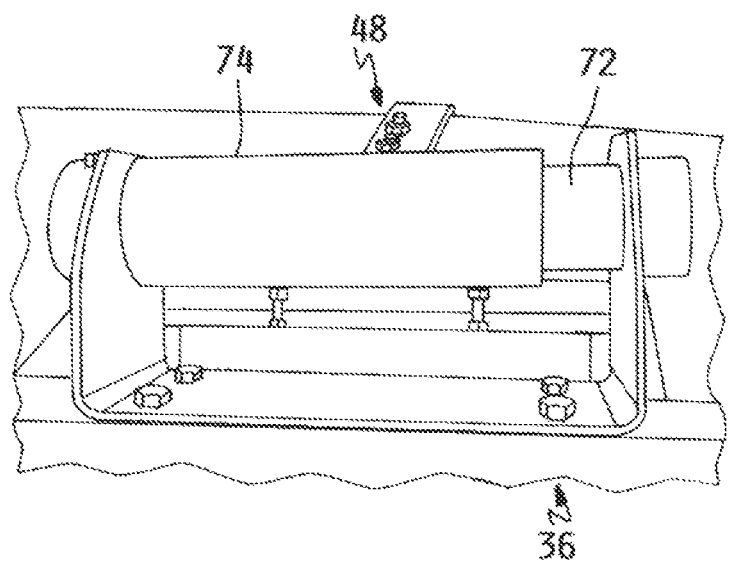
FIG. 10 is an outer perspective view of the intermediate hinge assembly attached to the rail car.

The lower portion of the intermediate hinge assembly 36 may have a generally cylindrical region 72 having a first width. The hinge mechanism 48 may have a generally cylindrical region 74 that extends over the first cylindrical region 72. The second cylindrical region 74 has a second width that is smaller than the first width, as illustrated in FIG. 10. In certain embodiments, the difference between the first width and the second width is between about 1 inch and about 6 inches.

Forming the second width that is smaller than the first width enables the hinge mechanism 48 to slide laterally with respect to the portion of the intermediate hinge assembly 36 that is attached to the rail car 22. Such a configuration minimizes the potential of the hinge mechanism 48 binding when the cover material 60 is tightened to ensure tautness as is discussed above.

In certain embodiments, the cover system 10 may include an upper frame member (not shown) that extends substantially along a length of the cover system 10 between the corner hinge assembly 30 and the intermediate hinge assembly 36 or between the intermediate hinge assemblies 36 opposite to where the cover system 10 attaches to the rail car 22.

The corner hinge assembly 30 and the intermediate hinge assembly 36 may be substantially covered by the cover material 60, which is fabricated from a strong yet relatively flexible material such as a tarp or belting. In certain embodiments, the flexible material 60 may be waterproof. Covering the corner hinge assembly 30 and the intermediate hinge assembly 36 with the flexible material 60 enables the cover system 10 to bend such as when coal extends above an upper edge of the rail car 22. Additionally, the flexible material 60 and the intermediate hinge assemblies 36 can deflect in response to the low pressures caused as the coal is discharged from the bottom of the rail car 22.

The flexible material 60 should possess a high degree of strength and resist damage caused by objects contacting the flexible cover 60. In certain embodiments, the flexible material 60 may have a configuration that is similar to the material used for fabricating conveyor belts or swather belts.

To ensure that the cover material 60 remains taut when the rail car cover system 10 is in the closed configuration, it is important that the connection between the cover material 60 and the corner hinge assembly 36 restrict movement of the cover material 60 with respect to the corner hinge assembly 36.

In one such configuration, the cover material 60 is retained between the corner hinge assembly 36 and an angle iron 86. The angle iron may have two legs that are oriented generally transverse to each other. Such a configuration not only provides a relatively large surface to contact the cover material 60 but also enhances the strength of the corner hinge assembly 36 when forces are placed thereon such as when the rail car 22 is moving or the rail car cover system 10 is moving between the open configuration and the closed configuration.

A sleeve may be provided in the flexible material 60 proximate to where the intermediate hinge assembly 36 is attached to the flexible material 60. Such a configuration enables the flexible material 60 to slide with respect to the intermediate hinge assembly 36.

Movement of the first cover section 24 and the second cover section 26 between the open and closed configurations may be accomplished using a mechanical assist such as a hydraulic actuator 70. Depending on the size of the rail car cover system 10, it is also possible to manually move the first cover section 24 and the second cover section 26 between the open and closed configurations. Another method is to use the train movement to cause the first cover section 24 and the second cover section 26 to move between the open and closed configurations.

At least one of the hydraulic actuators 70 may be placed along each side of the rail car. In certain embodiments, one of the hydraulic actuators is mounted proximate each of the corners of the rail car 22. In certain embodiments, one of the hydraulic actuators 70 is an integral part of the corner hinge assembly 30 while in other embodiments, the hydraulic actuator 70 is placed adjacent to each of the corner hinge assemblies 30.

The hydraulic actuator 70 is selected with a sufficient capacity to move the first cover section 24 and the second cover section 26 between the open and closed positions. The hydraulic actuator 70 may also be mounted inside of the rail car 22. A mounting bracket is used to attach the hydraulic actuator 70 to the rail car 22.

In certain embodiments, the operation of the rail car cover system 10 is controlled with a hydraulic pump 104 that is operably connected to the hydraulic actuator 70. Through the use of hydraulic actuators 70 to control the operation of the rail car cover system 10, the rail car cover system 10 operates in a highly reliable manner independent of external factors such as the ambient temperature and the presence of precipitation. The hydraulic pump 104 may be reversible for opening and closing of the cover system 10. Alternatively, a directional valve may be utilized in conjunction with a single direction hydraulic pump 104.

A single hydraulic pump 104 may be utilized to simultaneously power the operation of all of the hydraulic actuators 70 on the cover system 10. Alternatively, it is possible to independently operate each of the hydraulic actuators 70.

Through the use of counterbalance valves 71 on the hydraulic actuators 70 to control the operation of the rail car cover system 10, the rail car cover system 10 is locked in a stationary position when the hydraulic pump 104 stops. The counterbalance valves 71 also provide smooth stable motion when dealing with an over-center load. For example, this configuration retains the rail car cover system 10 in the open position when loading and unloading the rail car 22 and in the closed position when the rail car 22 is moving when loaded.

This system thereby reduces the potential of damage to the components of the rail car cover system 10 caused by the rail car cover system 10 inadvertently moving from either the open position or the closed position. The counterbalance valve 71 may be mounted adjacent to the hydraulic actuator 70 so that if one of the hydraulic lines experiences a failure, the counterbalance valve 71 would cause the hydraulic actuators 70 to remain in a fixed position.

Instead of using a hydraulic system to operate the first and second cover sections 24, 26, it is possible to use other power sources to operate the first and second cover sections 24, 26. An example of one such suitable alternative power source is an electric linear actuator. The electric linear actuator may be configured to be positioned in a location that is similar to the hydraulic system components.

The electric linear actuator should be selected to provide the torque necessary to operate the first and second cover sections 24, 26 even when the first and second cover sections 24, 26 are subjected to external forces such as wind. A potential advantage of selecting the electric linear actuator is that it may be possible to more accurately track the location of the first and second cover sections 24, 26 using the electric linear actuator than using the hydraulic system.

In certain embodiments, the operation of the first and second cover sections 24, 26 can be controlled with an on-board power source. The on-board power source enables the rail car cover system to be operated without physical improvements to the area in which the rail car cover system will be operated. One suitable on-board power source at least one battery 100. The batteries 100 may be mounted on each of the rail cars 22 to enable the rail cars 22 to operate independently such that if something goes wrong with a component on one of the rail cars 22, that rail car 22 can be disconnected from the remaining rail cars.

The batteries 100 should be selected to provide the components of the rail car cover system 10 with sufficient power. In certain embodiments, the batteries are 12 volt batteries and 2 batteries are provided. While only one of the batteries 100 may be used to operate the control system, both batteries 100 may be utilized to provide 24 volts for operating the hydraulic pump 104.

The length of time that the rail car cover system 10 may be operated may be affected by external factors such as the ambient temperature where the rail car cover system 10 is intended to be operated. For example, when the ambient temperature is relatively low such as being less than about 32° F., the length of time that the batteries 100 can operate the rail car cover system 10 may be reduced as compared to when the rail car cover system 10 is operated at elevated temperatures that are considerably higher than 32° F.

When the ambient temperatures are greater than about 32° F., the battery 100 may have sufficient power to operate the rail car cover system 10 between about 15 and about 30 cycles in which the rail car cover system 10 is moved between the open position and the closed position.

When the ambient temperatures are less than about 32° F., the battery 100 may have sufficient power to operate the rail car cover system 10 between about 5 and about 15 cycles in which the rail car cover system 10 is moved between the open position and the closed position.

While it is possible to use non-rechargeable batteries that are replaced when depleted, using rechargeable batteries may not only reduce operation cost but also eliminate the time associated with replacing depleted batteries.

In certain embodiments, an on-board charging system is provided to periodically recharge the batteries. An example of one suitable on-board charging system utilizes at least one solar panel 106. A person of skill in the art will appreciate that the size of the solar panels 106 depend on the energy needed to operate the rail car cover system 10.

The solar panel 106 may be mounted in a variety of locations on the rail car 10. However, there may be restrictions on such permissible mounting locations. For example, mounting the solar panel 106 on the side of the rail car 22 may cause the rail car 22 to have a width that is too great. In certain embodiments the solar panel 106 is mounted proximate to an end of the rail car, as illustrated in FIG. 25.

The solar panel 106 may be mounted offset from a center of the rail car 22 on the end of the rail car 22. Mounting the solar panel 106 in this manner reduces the potential that if two rail cars 22 are oriented with the solar panel 106 ends facing each other that the solar panels 106 will not contact each other either when the train is moving straight or when the train is moving along curved tracks.

The mounting position of the solar panel 106 on the rail car should also facilitate solar rays impinging upon the solar panel 106 for the largest amount of time. One such location that enhances the solar rays impinging on the solar panel 106 is mounting the solar panel 106 proximate an upper edge of the rail car 22.

Because rail cars are typically connected together to form a train when transporting product, there is a limited amount of space between adjacent rail cars in which equipment such as the solar panels 106 and the cover system control equipment may be mounted at the ends of the rail cars.

This limited amount of space is further reduced when the rail car is used in conjunction with a dumping apparatus that rotates the rail car to dump product from the top of the rail car. In such configurations, there is no more than about 9½ inches from the end panel of the rail car in which the solar panels 106 and the cover system control equipment may be located.

One technique that enables solar panels 106 having a larger surface area to be used with the rail car cover system is to mount the solar panels 106 in a non-horizontal orientation. An angle at which the solar panels 106 is mounted may be between about 30 degrees and about 60 degrees.

Even if the angle at which the solar panels 106 is mounted may be too steep to enable a desirable amount of solar rays to impinge upon the solar panels 106 when the rail cars are moving in a first direction such as north, the solar panels 106 will be oriented at a more advantageous configuration when the train is moving in a second direction that is distinct from the first direction such as south.

As is discussed in more detail herein, the batteries used to power the operation of the rail car cover system 10 have sufficient power to operate the rail car cover system 10 through multiple opening and closing cycles such that it is not necessary for the solar panels 106 to always be oriented in a manner that facilitates recharging the batteries.

In another embodiment, the solar panels 106 may be operably mounted to the rail car 22. Such an operable mounting may enable the solar panels 106 to rotate with respect to the rail car 22 to enhance the intensity of the solar rays that impinge on the solar panels 106.

In one such configuration, the solar panels 106 are mounted for pivoting about an axis that is generally aligned with an end of the rail car 22. In other embodiments, the solar panels 106 may be pivotable about more than one axis.

Mounting the solar panel proximate an upper edge of the rail car 22 also reduces the potential that the solar panel 106 could be intentional or unintentionally damage or removed by persons. In spite of these benefits, the solar panel 106 may be mounted using a technique that reduces the potential of the solar panel 106 being detached using conventional tools such as screw drivers or wrenches.

Another example of an on-board power system that may be used in conjunction with the rail car cover system 10 is a generator (not shown). The generator may engage one of the rails over which the rail car 22 rolls. It is also possible for the generator to engage one of the wheel assemblies on the rail car 22.

Yet another on-board power source that may be used to operate the rail car cover system 10 is obtained from the locomotive that is pulling the rail car 22. For example, compressed air may be used to control movement of the first and second cover section 24, 26. It is also possible for electricity to be provided by the locomotive.

Figure 3:
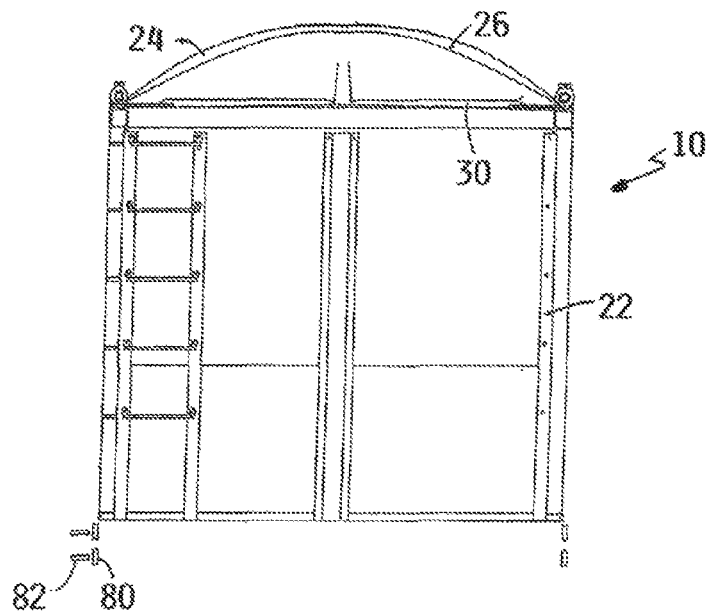
FIG. 3 is an end view of the rail car cover system in the closed configuration.

In certain embodiments, the hydraulic pump 104 could receive power from a pair of electric contact paddles 80 mounted on the rail car 22, as illustrated in FIG. 3, that interact with an additional pair of power rails 82 that are provided adjacent to the railroad tracks over which the rail car 22 moves. This system may be similar to the system that is used to control the opening and closing of gates on bottom dump rail cars.

The electric contact paddles 80 may be retractable and spring loaded to not only prevent damage to the contact paddles 80 but also to ensure good electrical contact between the contact paddles 80 and the power rails 82 that are utilized to power the operation of the hydraulic actuator 70.

In certain embodiments, the contact paddles 80 are provided on one side of the rail car 22. In other embodiments, the contact paddles 80 are mounted on both sides of the rail car 22. This later configuration enables the rail car cover system 10 to be operated irrespective of the direction in which the rail car 22 is traveling. In other embodiments, the power rails may be mounted along side of, above or below the rail car.

The power rails 82 are connected to positive and negative terminals of a DC power supply. The polarity of the power rails 82 will determine if the covers 10 are opening or closing. The length of the power rails 82 is determined by how fast the train is moving and how long the hydraulic pump needs to run to open and close the first and second cover sections 24, 26. Since the train speed may vary slightly when loading the rail cars 22, the power rails 82 need to be long enough to accommodate the fastest speed at which the train will move.

The contact paddles 80 may be mounted on the rail car 22 so that they will come into sliding contact with a pair of stationary power rails 82 as the rail car moves on the track. The interface between the rail car 22 and the loading/unloading facility is dimensionally stable and has low forces involved. This configuration is thereby reliable to operate in a variety of conditions over long periods of time.

As the rail cars 22 enter the loading/unloading facility, the rail cars 22 will initially go by first pair of power rails 82 that will run the hydraulic pump in a first direction to open the first and second cover sections 24, 26. Thereafter, the rail cars 22 will go by a second pair of power rails 82 with an opposite polarity that will run the hydraulic pump in an opposite direction to close the first and second cover sections 24, 26.

Other techniques for activating the cover system include GPS activation, proximity switches and laser beams. Another technique for controlling the operation of the rail car cover system 10 is using a wireless controller. A person of skill in the art will appreciate that a variety of protocols may be used for wireless communication between the control system and an associated wireless controller.

The hydraulic pump may operate longer than is needed to open or close the first and second cover sections 24, 26. A kick down relief valve may be provided that permits the hydraulic pumps to operate at a much lower pressure when tripped when the first and second cover sections 24, 26 reach the open or closed positions.

The pressure relief valve may have a pressure setting that is usually substantially higher than the highest pressure required by the circuit. All of the components in the circuit should have a pressure rating higher than the relief setting.

Due to the relatively small volume of oil flow in this system, the hydraulic system can safely run over a tripped relief for many minutes to accommodate the range of speed for a particular train. However, if the train were to stop for an extended period of time during the open/close cycle, the operator would need to de-energize the powered rails, which will result in turning off the hydraulic pump.

Figure 17:
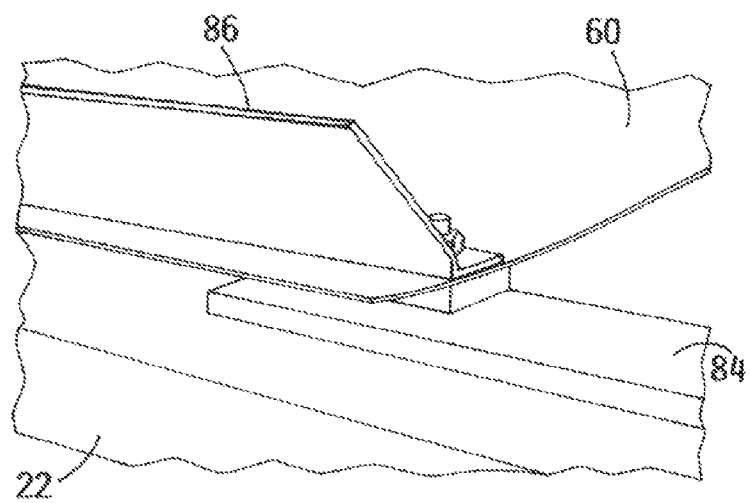
FIG. 17 is an end view of the rail car showing the rail car cover system in a closed configuration.

A plate 84 may be mounted on the upper surface of the ends of the rail car 22 such as is illustrated in FIG. 17. While it is possible for the plate 84 to extend substantially along the entire end of the rail car 22, the plate 84 may have a length that is less than the length of the end of the rail car 22. In certain embodiments, the plate 84 may be positioned proximate an end of the first cover section 24 and the second cover section 26 that are not attached to the rail car 22.

In another embodiment, the plate 84 may be mounted on the lower surface of the corner hinge assembly 30 that is adjacent to the upper surface of the end of the rail car 22 when the rail car cover system 10 is in the closed configuration.

The plate 84 may reduce damage to the components of the rail car 22 and the rail car cover system 10 caused by rubbing of the components together as the rail car is moving. The material used to fabricate the plate 84 may be relatively durable. An example of one such material that may be used to fabricate the plate 84 is an ultra-high molecular weight plastic.

Figure 18:
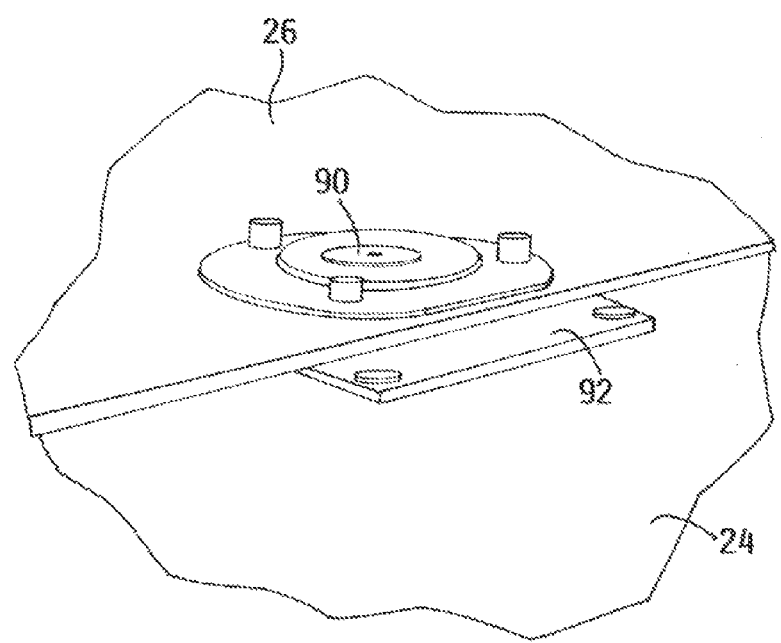
FIG. 18 is a top view of a magnet closure mechanism.

To further reduce the potential of the rail car cover system 10 inadvertently opening while in a closed configuration, a sealing mechanism may be provided along at least a portion of the center of the rail car 22 where the first and second cover sections 24, 26 overlap each other. One such suitable sealing mechanism encompasses at least one magnet 90 mounted to at least one of the first and second cover sections 24, 26 as illustrated in FIG. 18.

One such suitable magnet 90 that may be used in conjunction with the rail car cover system 10 is a permanent magnet. An advantage of using the permanent magnet is that an external power source is not needed to retain the magnet 90 in an attraction mode. However, since there may be an on-board power source that is used in conjunction with the rail car cover system 10, it may be possible to use this on-board power source in conjunction with electromagnets.

In certain embodiments, the permanent magnet is a rare earth magnet, which provides a high degree of magnetic attraction. One particularly suitable rare earth magnet that may be used in conjunction with the rail car cover system 10 is a neodymium magnet.

These magnets 90 should also resist loss of magnetic strength when subjected to elevated temperatures such as may be encountered if the rail car has to undergo thawing. The incorporation of this feature in the neodymium may require additional processing of the magnets. The neodymium magnets have a Curie point of greater than 400° F., which is greater than the temperatures used in conventional equipment for thawing railroad cars.

In certain embodiments, the magnets 90 may be mounted in a spaced-apart configuration on one of the first and second cover sections 24, 26. Since the ends of the first and second cover sections 24, 26 are held down with the hydraulic actuator, the spacing of the magnets 90 may be closest proximate a center of the first and second cover sections 24, 26. There may also be a section of the first and second cover sections 24, 26 that is proximate the ends thereof that does not have any magnets 90.

In one suitable configuration, one of the magnets 90 is placed proximate a center of the rail car 22. A distance between the center magnet 90 and the adjacent magnet 90 may be about 12 inches. A distance between subsequent adjacent magnets 90 may be progressively larger. For example, as moving toward the ends of the rail car 22, the distance between each set of magnets 90 may increase by one inch such that the spacing between adjacent pair of magnets 90 is 13 inches, 14 inches, etc as moving from a center of the rail car 22 towards an end of the rail car 22.

In certain embodiments, there are between about 10 and 30 magnets 90 mounted on the first cover section 24. In other embodiments, there are about 21 magnets 90 mounted on the first cover section 24. A person of skill in the art will appreciate that the number of magnets 90 utilized will depend on a variety of factors such as the strength of each of the magnets 90. It is also possible to provide the magnet in a strip that extends at least partially across a length of the rail car 22.

As the cover material 60 used in the first and second cover sections 24, 26 may be fabricated from non-metallic material, a metallic plate may be attached to the second cover section 26 so that the plate 92 is adjacent to one of the magnets 90 when the first and second cover sections 24, 26 are in the closed configuration.

The plate 92 may be formed with a thickness that is sufficiently large to provide a sufficient attraction between the plate 92 and the magnet 90 to retain the first and second cover sections 24, 26 in the closed configuration.

The plate 92 may be formed with a length and a width that are sufficiently large so that the magnet 90 is always over the plate 92 when the first and second cover sections 24, 26 are in the closed configuration. This configuration minimizes the potential of rubbing of the magnet 90 against the cover material 60, which could result in damage to the cover material 60.

The plate length and width may be selected to ensure that the desired position is obtained when there is a load of product such as coal in the rail car 22 as well as when no product is in the rail car 22. In certain embodiments, the plate 92 is formed with a length that is at least twice a length of the magnet 90.

At least one of the magnets 90 and the plates 92 may be at least partially recessed into the surface of the first and second cover sections 24, 26. Recessing the magnet 90 and the plate 92 into the surface of the first and second cover section 24, 26, respectively, reduces a thickness of the first and second cover sections 24, 26.

In certain embodiments, a hole may be formed in the first and second cover section 24, 26 that has a profile that conforms to a profile of the magnet 90 or the plate 92 that is intended to be mounted in that location.

Figure 19:
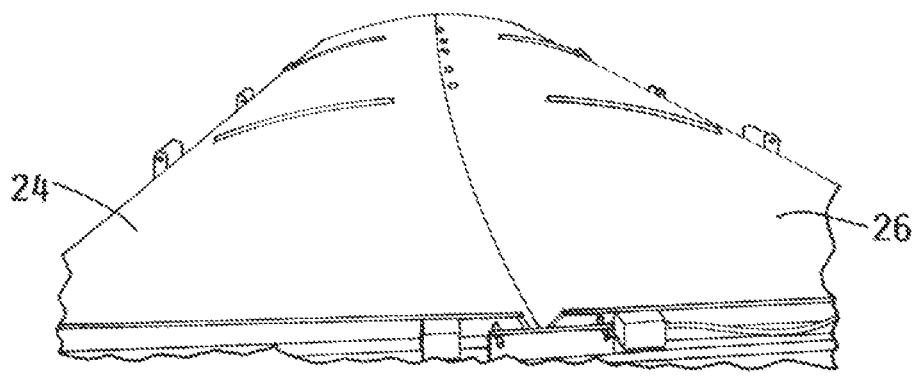
FIG. 19 is an end view of the rail car cover system in a closed configuration.
Figure 20:
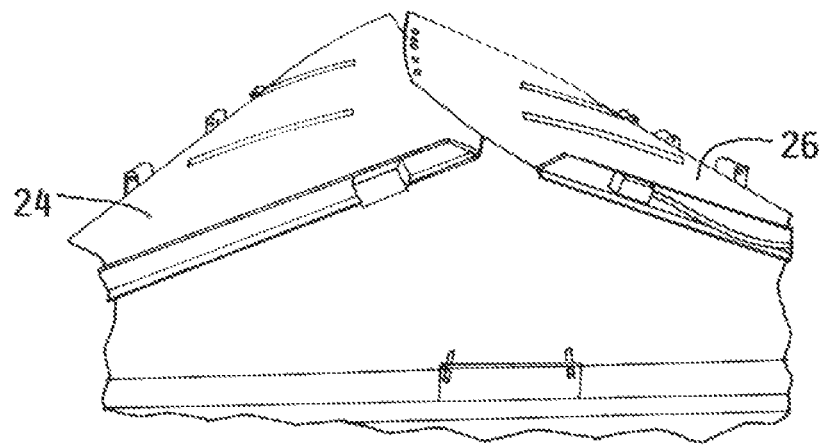
FIG. 20 is an end view of the rail car cover system in a first opening configuration.
Figure 21:
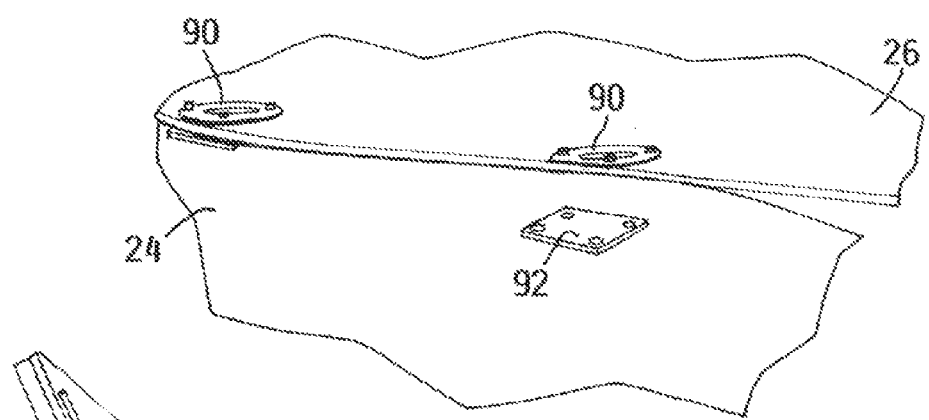
FIG. 21 is an enlarged close-up view of a magnet closure mechanism on the rail car cover system.
Figure 22:
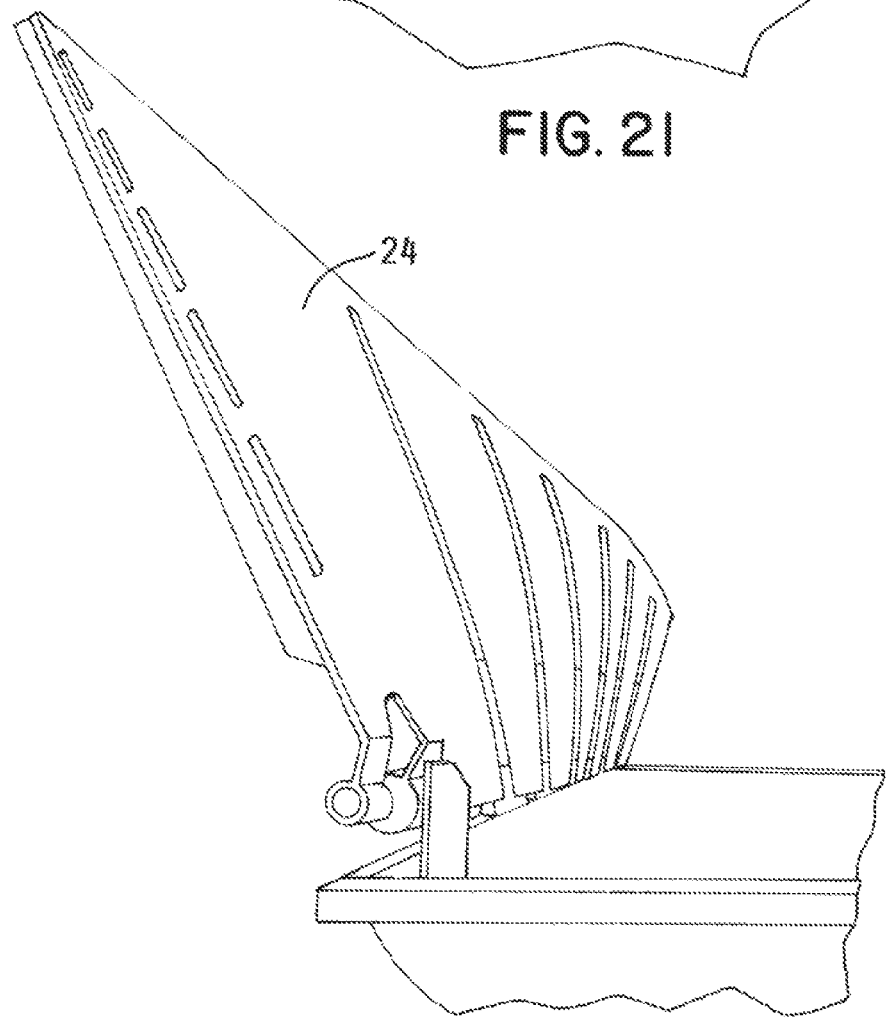
FIG. 22 is an end view of the rail car cover system in a second opening position.
Figure 23:
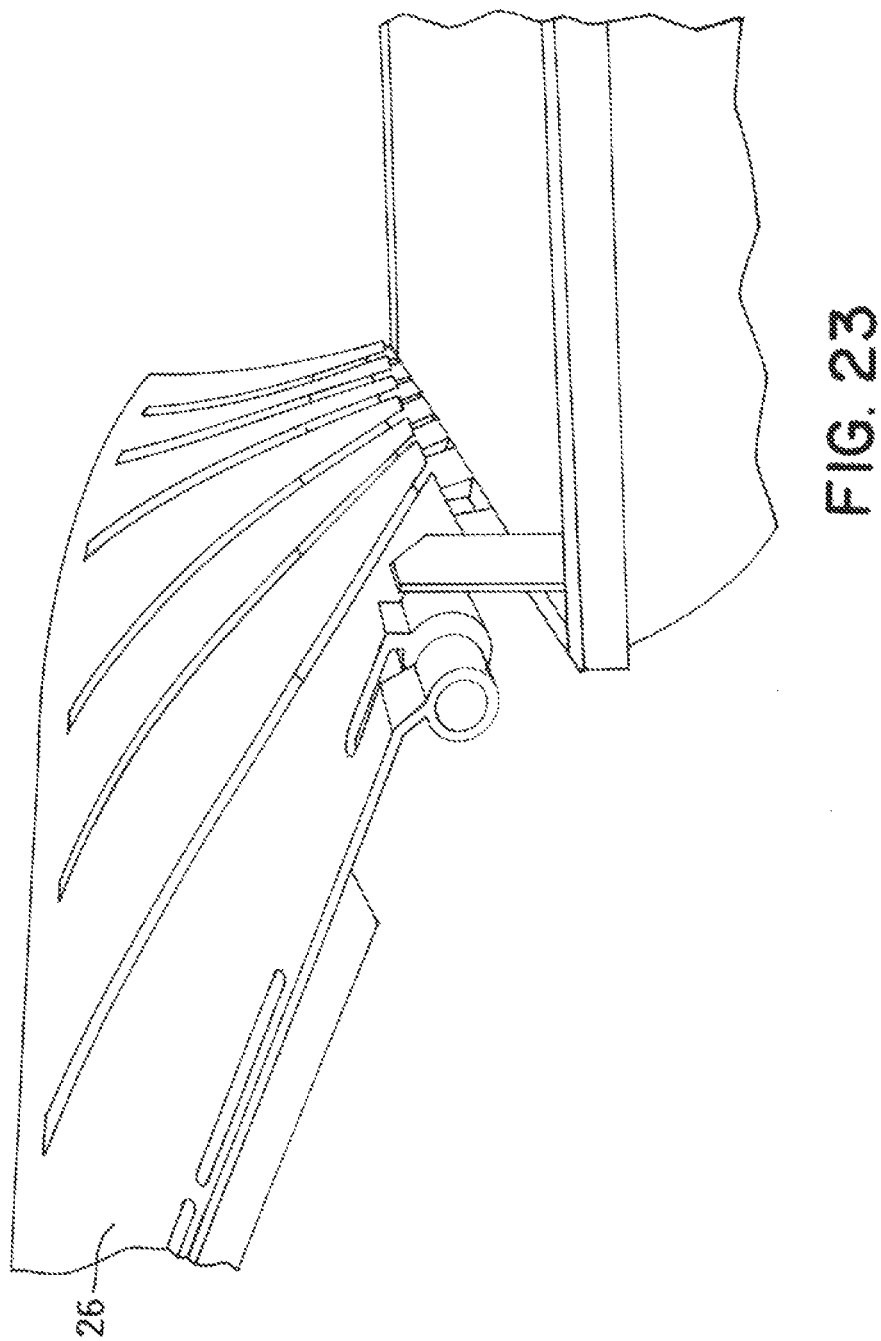
FIG. 23 is an end view of the rail car cover system in a third opening position.

The rail car cover system 10, which is illustrated in FIG. 19, where the magnets 90 and the plates 92 engage each other to retain the first and second cover sections 24, 26 in the closed configuration. As the first and second cover sections 24, 26 begin moving to the open configuration, as illustrated in FIG. 20, the magnets 90 and the plates 92 begin separating from each other, as illustrated in FIG. 21. The first and second cover sections 24, 26 continue pivoting toward the open configuration, as illustrated in FIGS. 22 and 23.

As discussed above, it is desired for each of the end arm mechanisms 30 and each of the intermediate arm mechanisms 40 to independently operate. Because of this configuration, there may not be a rail that extends along a lower edge of each of the first and second cover sections 24, 26.

Figure 11:
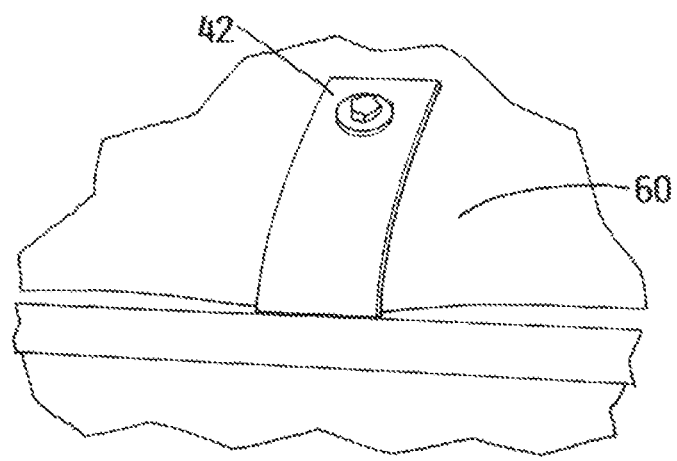
FIG. 11 is an outer view of an anti-flutter strap.
Figure 12:
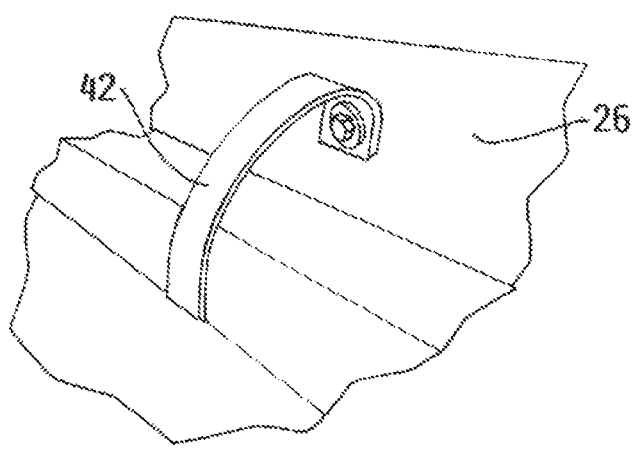
FIG. 12 is an inner view of the anti-flutter strap.

To reduce the potential of air blowing underneath the lower edge of the cover, at least one anti-flutter strap 50 may be attached between each of the intermediate arm mechanisms 40 as well as between the end arm mechanism 30 and the adjacent intermediate arm mechanism 40, as illustrated in FIGS. 11 and 12.

An upper end of the anti-flutter strap 42 may be attached to the first and second cover section 24, 26 using a variety of fastening techniques. One such suitable fastening technique is a rivet. A lower end of the anti-flutter strap 42 may be attached to the rail car 22. In certain instances where there are restrictions on how objects may be attached to the rail car 22, the lower end of the strap may be attached to the rivet line along the rail car 22.

The anti-flutter strap 42 may be fabricated from a variety of materials using the concepts of the invention. One such suitable material for fabricating the anti-flutter strap 42 is a nylon strap. In certain embodiments, the anti-flutter strap 42 may have sufficient strength to resist stretching in response to wind blowing under the first and second cover sections 24, 26.

To minimize the potential of damage to the rail car cover system 10 and to reduce the potential of the product in the rail car 22 from coming out of the rail car 22 and minimize the potential of environmental elements from contacting the product in the rail car 22, it is desirable for each of the first and second cover section 24, 26 to be in a closed configuration prior to moving the rail car 22.

Figure 13:
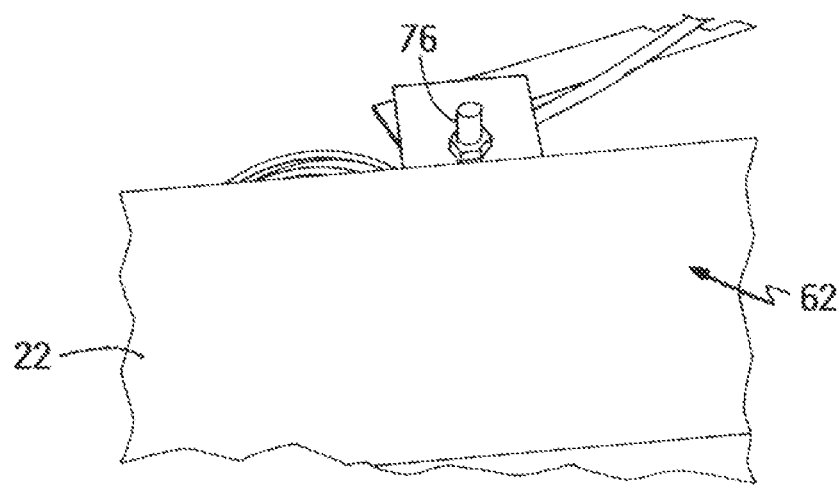
FIG. 13 is a perspective view of an upper portion of the rail car showing a first sensor portion of a cover position sensor.

To ensure that the first and second cover sections 24, 26 are in the closed position, the first and second cover sections 24, 26 may each include at least one cover position sensor 62, as illustrated in FIG. 13. In certain embodiments, the first and second cover sections 24, 26 each include a cover sensor on each of the side edges.

Figure 14:
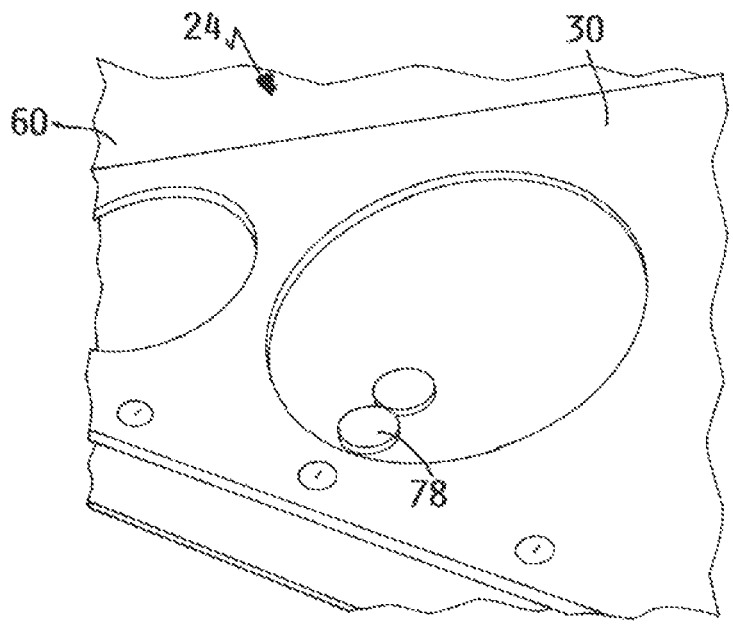
FIG. 14 is a lower perspective view of the rail car cover system showing a second sensor portion of the cover position sensor.

In one such configuration, the cover position sensor 62 include a first sensor portion 76 that is mounted to the rail car 22 and a second sensor portion 78 that is mounted to the first cover section 24. One of the first sensor portion 76 and the second sensor portion 78 may be a magnetic proximity sensor and the other one of the first sensor portion 76 and the second sensor portion 78 may be a magnetic material such as a disc, which is illustrated in FIG. 14.

A person of skill in the art will appreciate that alternative configurations may be used for the proximity sensor. Examples of such alternative configurations include inductance, capacitance and photoelectric.

When the first cover section 24 nears the closed configuration, the second sensor portion 78 is sufficiently close to the first sensor portion 76 such that the cover portion sensor 62 will report that the first cover section 24 is in the closed configuration.

Figure 15:
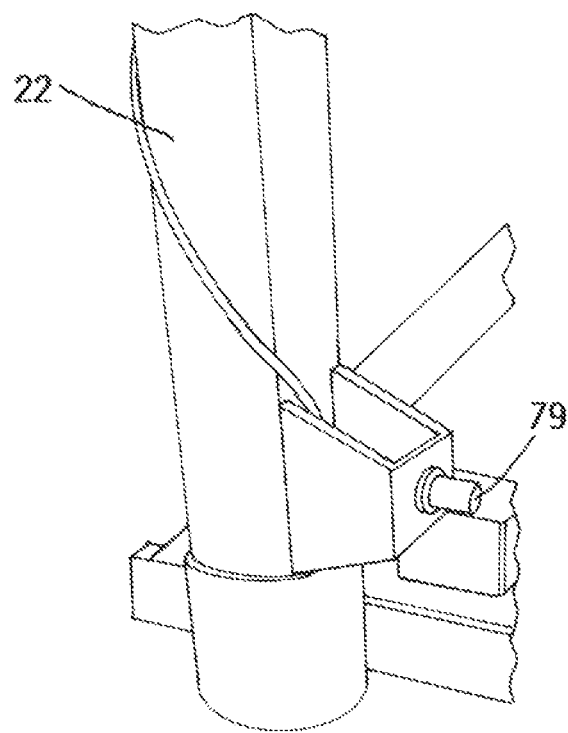
FIG. 15 is a perspective view of a side of the rail car showing a third sensor portion of the cover position sensor that senses when the rail car cover system is in the open configuration.

A similar process may be used for determining when the first cover section 24 is in the open configuration. A third sensor portion 79 may be mounted to the side of the rail car 22, as illustrated in FIG. 15. As the first cover section 24 is moved to the open configuration, the second sensor portion 78 gets sufficiently close to the third sensor portion 79 so that the cover portion sensor 62 will report that the first cover section 24 is in the open configuration.

While the preceding description is with respect to monitoring the position of the first cover section 24, a person of skill in the art will appreciate that a similar process may be utilized for monitoring the position of the second cover section 26.

Figure 16:
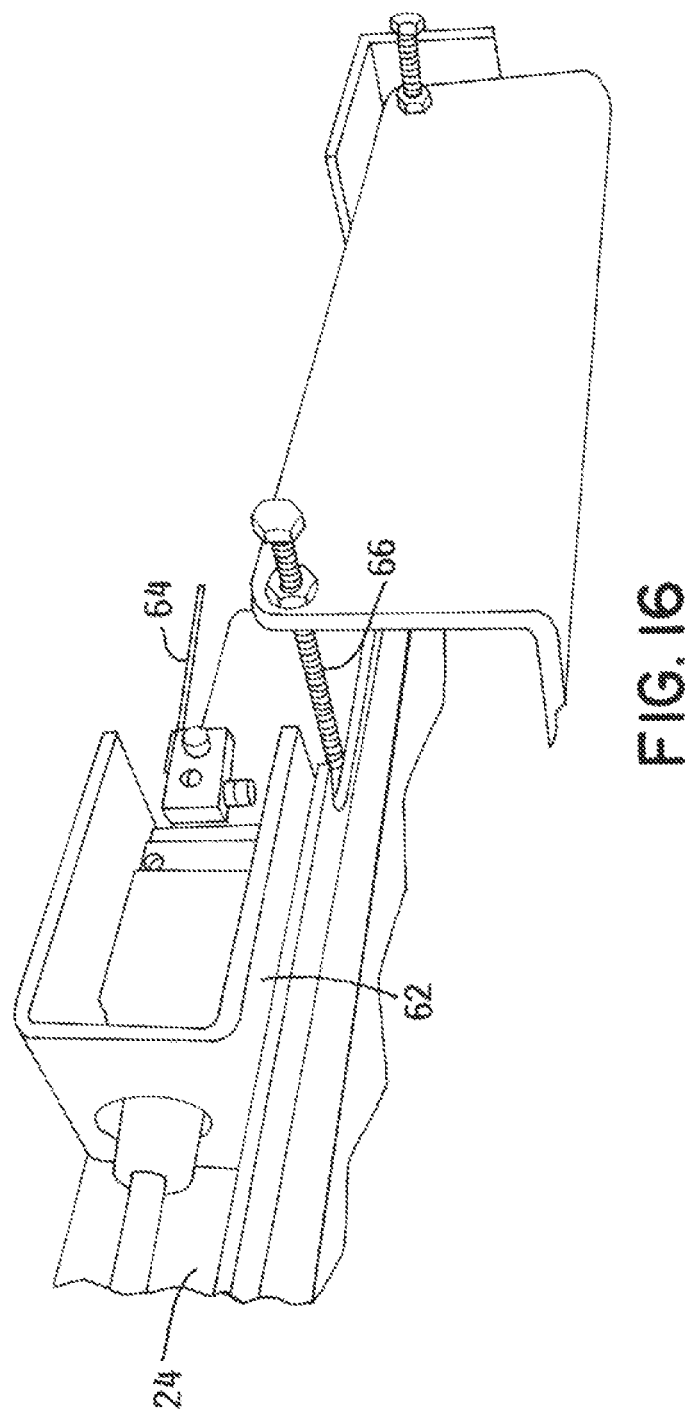
FIG. 16 is a perspective view of an upper portion of the rail car showing an alternative closed cover position sensor.

In another embodiment, the cover sensor 62 may include a base switch with a post 64 extending therefrom, as illustrated in FIG. 16. Pivoting of the post with respect to the base switch causes the base switch to move between on and off configurations. A rail car engagement mechanism 66 may be provided on the rail car 22. When the first and second cover section 24, 26 are in the closed configuration, the post 64 engages the rail car engagement mechanism 66 and thereby causes the switch 66 to move to the closed configuration.

Alternatively or additionally, it is possible to include a position sensor on at least one of the hydraulic actuator. The position sensor could determine the rotational position of the hydraulic actuator to determine when the first and second cover section 24, 26 are in the closed configuration.

Figure 24:
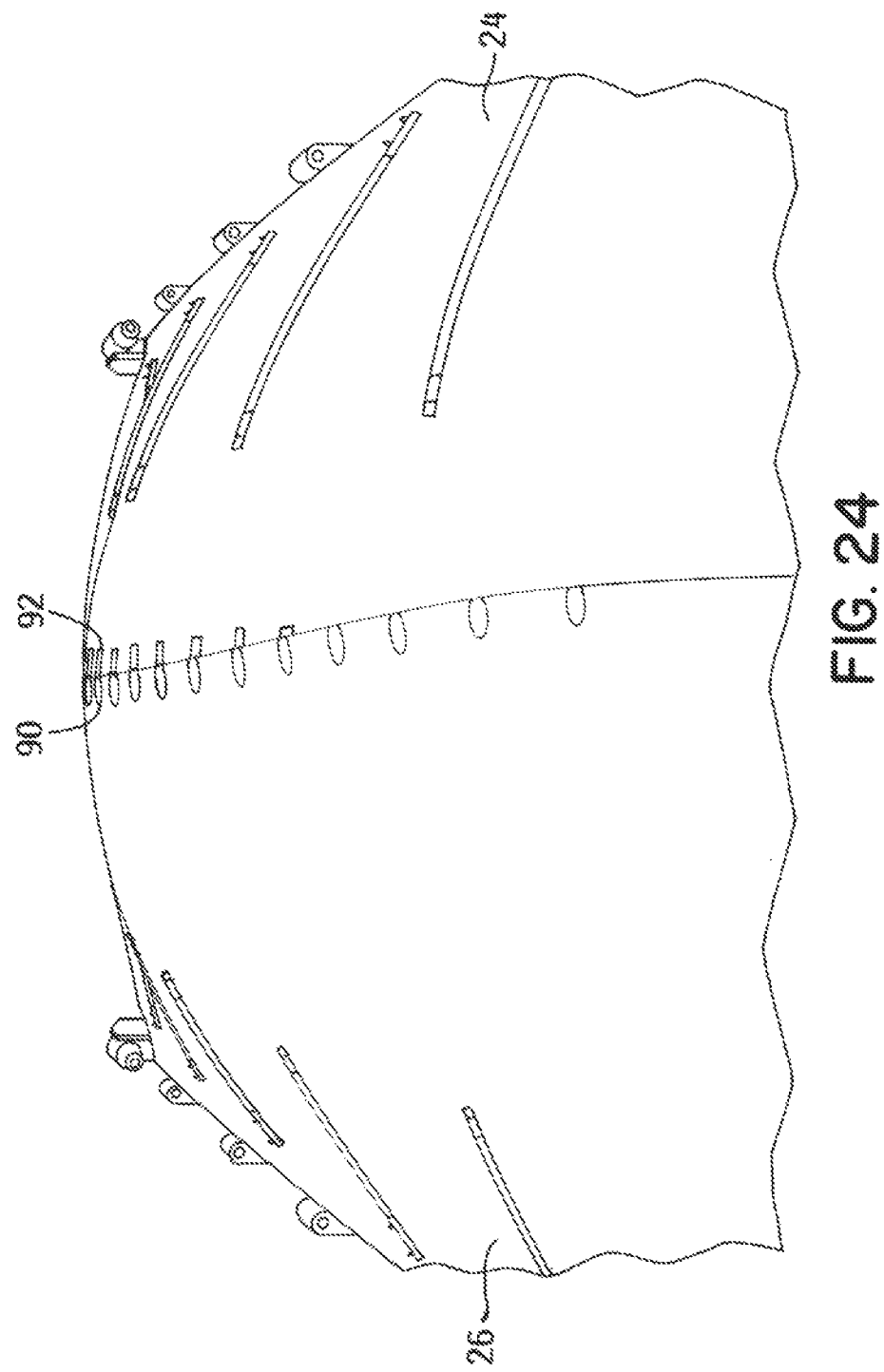
FIG. 24 is an end view of the rail car cover system in a closed position over a load.

In certain situations, it is not possible for the first and second cover sections 24, 26 to move to the closed configuration after the product is loaded into the rail car 22, as illustrated in FIG. 24. For example, coal occupies a greater volume when initially placed into the rail car 22. In response to the vibrating motion caused by the movement of the rail car 22, the coal may compact, which causes the volume of the coal to decrease.

The uncompacted coal may extend above an upper surface of the rail car 22 to an extent such that the rail car cover system 10 engages the coal pile. The contact between the rail car cover system 10 and the top of the coal pile may prevent the first and second cover sections 24, 26 from moving to the closed configuration.

Forcing the first and second cover section 24, 26 to the closed position when the coal pile prevents the first and second cover sections 24, 26 from moving to the closed position could not only put large forces on the first and second cover sections 24, 26 but also on the hydraulic components that cause the first and second cover sections 24, 26 to move between the open and closed configurations.

To minimize the problems caused by such forces, the rail car cover system 10 may have a pressure sensor. When the pressure sensor senses that the force needed to move the first and second cover sections 24, 26 exceeds a selected value, the pressure sensor may cause the hydraulic system to turn off.

At a selected time later, the hydraulic system may be reinitiated to attempt to move the first and second cover sections 24, 26 to the closed configuration, which is illustrated in FIG. 19. This delay can provide the coal pile time to settle caused by vibrations from the movement of the train. In certain embodiments, the selected time is between 10 and 20 minutes. In other embodiments, the selected time is about 15 minutes.

If the pressure sensor still measures a pressure that is greater than the threshold pressure, the pressure sensor will cause the hydraulic system to turn off. This process may be repeated until the first and second cover sections 24, 26 are indicated to be in the closed configuration by the cover sensor. Alternatively, the process may be repeated for a specified number of times before the process will be terminated. In certain embodiments, the process may be repeated 10 times. Terminating the process could prevent depletion of the batteries.

As is discussed in more detail herein, the activities of the pressure sensor may be recorded in a memory device within the control panel. Recording the activities can be used to determine whether there are problems with the manner in which the coal is loaded in the rail car 22. For example, even though a desired weight of coal is placed into the rail car 22, the coal may not be evenly distributed along the length of the rail car 22.

The rail car cover system 10 may also include an indicator that indicates when the first and second cover sections 24, 26 are not in the closed configuration. In certain embodiments, the indicator is a light that is visible to persons who are proximate to the rail car 22 having the rail car cover system 10.

The light may be operable in a variety of modes to indicate the status of the rail car cover system 10. For example, the light may constantly illuminate green when the rail car cover system 10 is in the closed configuration. When the rail car cover system 10 is not in the closed configuration, the light may illuminate in a different color such as red or the light may flash.

The train speed should not pose an issue at a rotary tipper unloading facility because the train is moving at a relatively slow speed in the unloading facility. The train speed can be set to optimize the performance of the rail car cover system. In certain embodiments, the entire train could have every cover open at a rotary tipper site before the rail car tipping process is begun.

The first and second cover sections 24, 26 expose a large surface to the wind and should only be opened or closed if wind conditions are light to moderate unless moving of the first and second cover sections 24, 26 between the opened and closed positions is done in a sheltered location.

In regions where the wind is relatively high, it may be desirable to provide a barrier along at least one side of the train where it is desired to operate the rail car cover system 10. In one configuration, the barrier may be provided by a line of trees or other vegetation. In other configurations, the barrier may be a fabricated wall.

It is not necessary for the barrier to extend the entire length of the train set with cover system 10 that are desired to be operated. Additionally, it is not required that the barrier extend above a maximum height of the first and second cover sections 24, 26 when oriented in a generally vertical configuration when moving between the open configuration and the closed configuration. Rather, the barrier should provide sufficient reduction in wind force to enable the first and second cover sections 24, 26 to reliably move between the open and closed configurations.

With rotary tipper rail cars, the cover 10 must be opened before dumping the coal. In the open position, the cover 10 and hinge assemblies 30, 36 are substantially adjacent the top chord of the rail car. In this position, the rail car can be leaned up against the spill girder of the tipper mechanism, clamped down and rotated over to dump the coal without damaging any of the components of the cover system 10.

All of the weight of the rail car and the coal is compressing the hinge plates and the cover material under those plates. There will be no load transferred to the hinges or the hydraulic rotary actuators. This occurs because the hinge plates and covers are firmly clamped to the top chord before they are attached to the rail car.

With bottom dumping rail cars, the first and second cover sections 24, 26 could remain in the closed position during the unloading process. If coal is dumped faster than air can leak into the rail car 22, the first and second cover sections 24, 26 will flex downwardly until a gap forms in between them down the center of the rail car 22.

This gap allows a sufficient volume of air to enter the rail car 22 to fill the void and relieve the low pressure caused by the exiting coal without damaging either the rail car 22 or the rail car cover system 10. Thereafter, the first and second cover sections 24, 26 will return to their original position.

The hydraulic actuators 70 may be connected using a coupling mechanism such as a quick disconnect coupler that enables the hydraulic actuator 70 to be disconnected to permit manual operation of the first and second cover sections 24, 26.

Alternatively, the rail car cover system 10 may include locking mechanisms such as counterbalance valves that retain the first and second cover sections 24, 26 in the open configuration and/or the closed configuration. Such locking mechanisms may play an important role if it is necessary to disconnect the hydraulic actuators 70 or if there is a leak in the hydraulic system.

While it is generally desired to only position the first and second cover sections 24, 26 in the open configuration for loading and/or unloading of the rail car 22, it is possible to position the first and second cover sections 24, 26 in the open configuration when moving the rail car 22 for larger distances because the first and second cover sections 24, 26 may be substantially parallel to sides of the rail car 22 when in the open configuration. As noted above, the hydraulic actuator 70 or the locking mechanisms could retain the first and second cover sections 24, 26 in the open configuration.

Other possible methods for actuating the first and second cover sections 24, 26 include vacuum suction cups that would lift part or all of the cover up and over from an onsite structure mounted apparatus. A helix shape spiral track could guide the leading edge of the covers up and over from the onsite structure mounted apparatus.

An electromagnet lifting device could lift the leading end up and over from an onsite structure mounted apparatus. A vertical cam actuator at the hinge point could rotate the cover up and over from an onsite structure mounted apparatus.

In another embodiment of the invention, the rail car cover system 10 may include a cover that is formed in two sections. Similar to the embodiment discussed above, the first and second cover sections may be pivotally mounted to the rail car. Magnets may be used to maintain the first and second cover sections 24, 26 in the closed configuration.

The first and second cover sections 24, 26 may be moved between the open and closed configurations using a second magnet having a power that is stronger than the magnets used to maintain the first and second cover sections 24, 26 in the closed configuration. The second magnets may be electromagnets that may be deactivated when not needed. The second magnets are positioned proximate the center of the rail car 22 and then activated. The second magnets may be moved to cause the first and second cover sections 24, 26 to move from the closed configuration to the open configuration.

In yet another configuration, an elevated surface is provided adjacent to the rail car 22. When an arm on the rail car 22 is urged upwards by the elevated surface, the mechanism to cause movement of the cover system 10 from the closed configuration to the open configuration is activated. During which time, the product may be placed in the rail car 22. Thereafter, when the elevated surface is discontinued, the cover system 10 may be caused to move from the open configuration to the closed configuration.

The control system may be housed in an enclosure that is mounted to the rail car 22. In certain configurations, the control system is mounted proximate the hydraulic pump and the solar panel, which are described in other portions of this patent application. The control system may be mounted to what is referred to as the A end of the rail car 22, which is to be distinguished from the B end of the rail car 22, where the brake is located.

The control system includes the circuitry needed for the operation of the rail car cover system. A person of skill in the art will appreciate that the control system may be implemented in a variety of manners using the concepts of the invention. One such control system is a PLC controller.

In addition to controlling the operation of the rail car cover system, the control system may also include a memory module that tracks aspects relating to the operation of the rail car cover system 10. For example, the memory may record the number of times that the rail car cover system 10 has moved between the opened and closed configurations. The memory can also record the status of the battery.

As discussed above, it is desirable to avoid flutter in the cover material 60, as the flutter could cause damage to the cover material 60 and the other components of the rail car cover system 10 if the flutter is permitted to continue. The flutter may be facilitated when the cover material 60 is not taut.

One such time in which the cover material 60 may not be taut is as the first and second cover sections 24, 26 are moving between the open and closed configurations. To maintain the tautness of the cover, one of the ends of each of the first and second cover section 24, 26 may be moved first to provide the first and second cover section 24, 26 with a partial spiral shape when moving between the open and closed configurations. In such a process, one end of each of the first and second cover section 24, 26 may be permitted to move before an opposite end of the first and second cover section 24, 26.

To ensure that the first cover section 24 and the second cover section 26 close in a desired order so that the end of the first cover section 24 on which the plates are mounted is beneath the end of the second cover section 26 on which the magnets 90 are mounted, the control system may be configured to cause the first cover section 24 to move completely from the open configuration before the second cover section 26 is moved from the open configuration to the closed configuration.

When using a hydraulic system to control the operation of the first and second cover sections 24, 26, the hydraulic actuator 70 with the least resistance may move first. Because the hydraulic actuators 70 proximate the control system end of the rail car 22 are closer to the hydraulic pump, these hydraulic actuators 70 would likely move first.

It is important that rail car cover system 10 operate reliably because if the rail car cover system 10 fails to open prior to the loading operation, it may not be possible to operate the entire train with the rail car 22 being filled, especially if the unfilled rail car 22 is proximate the front of the train. In these situations, the train would have to be moved out of the loading area so that the rail car 22 with the non-working rail car cover system 10 to be removed from the train set or serviced.

In view of this situation, the control system may include a manual override that allows the rail car cover system 10 to be manually operated in situations where the primary controller fails or is otherwise not operable. The manual override may include at least one button. Depressing the button causes the rail car cover system 10 to move between the open and close configurations.

For instances where there is a complete failure of the control system, the control system and/or the hydraulic pump may include a port such as a hex connection that allows the rail car cover system 10 to be operated by attachment to an external power source. An example of one such external power source is a drill.

To further increase the reliability of the control system, the control system may be fabricated in a modular configuration that permits individual parts of the control system to be readily replaced if one of the components experiences a failure.

It may be desirable to insulate the components of the control system from vibrations that are generated by or transmitted through the rail car 22. The insulation may be provided by mounting the control system on cushions to eliminate or significantly reduce the vibrations from passing through to the control system.

The control system may be mounted within an enclosure. The enclosure may not only protect the components of the control system from damage by environmental aspects but also protect the control system against intentional damage or vandalism. The enclosure may include a locking mechanism that provides only selected persons with the ability to access the components within the enclosure.

A light may be provided on a surface of the control panel to indicate the operational status of the rail car cover system. In one such configuration, the light may indicate whether the rail car cover system 10 is turned on such as by illuminating green. In another configuration, the light may indicate when there is a problem with the operation of the rail car cover system 10 such as by flashing red.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A rail car cover system comprising:
   a rail car having an opening; and
   a first cover section operably attached to the rail car, wherein the first cover section comprises:
   a first corner hinge assembly pivotally mounted to the rail car;
   a second corner hinge assembly pivotally mounted to the rail car and wherein at least a portion of the second corner hinge assembly is slidable away from the first corner hinge assembly; and
   a first cover material that is operably attached to the first corner hinge assembly and the second corner hinge assembly.

2. The rail car cover system of claim 1, wherein the second corner hinge assembly further comprising a mounting mechanism and wherein the mounting mechanism comprises:
 a first adjustment portion attached to the rail car; and
 a second adjustment portion that is slidable with respect to the first adjustment portion, wherein the second adjustment portion is attached to an arm that engages the first cover portion.

3. The rail car cover system of claim 2, wherein the mounting mechanism further comprises an adjustment mechanism that is capable of causing the second adjustment portion to slide with respect to the first adjustment portion.

4. The rail car cover system of claim 3, wherein the adjustment mechanism comprises a screw that operably connects the first adjustment portion and the second adjustment portion.

5. The rail car cover system of claim 2, and further comprising a locking mechanism that is capable of preventing the first adjustment portion from sliding with respect to the second adjustment portion.

6. The rail car cover system of claim 5, wherein the locking mechanism comprises at least one bolt that engages the first adjustment portion and the second adjustment portion.

7. The rail car cover system of claim 1, wherein the first cover section further comprises at least one intermediate arm assembly pivotally mounted to the rail car intermediate the first corner hinge assembly and the second corner hinge assembly.

8. The rail car cover system of claim 7, wherein at least a portion of the first intermediate arm assembly is slidable away from the first corner hinge assembly.

9. The rail car cover system of claim 1, and further comprising a mechanical assist for moving the first cover section between an open configuration and a closed configuration.

10. The rail car cover system of claim 9, wherein the mechanical assist is a hydraulic actuator.

11. The rail car cover system of claim 9, and further comprising:
 a power system for operating the mechanical assist; and
 a control system for controlling the movement of the first cover section between the open configuration and the closed configuration, wherein the power system and the control system are each mounted on the rail car.

12. The rail car cover system of claim 1, and further comprising a second cover section operably attached to the rail car, wherein the second cover section comprises:
 a third corner hinge assembly pivotally mounted to the rail car;
 a fourth corner hinge assembly pivotally mounted to the rail car and wherein at least a portion of the fourth corner hinge assembly is slidable away from the first corner hinge assembly; and
 a first cover material that is operably attached to the first corner hinge assembly and the second corner hinge assembly.

13. The rail car cover system of claim 1, wherein the first cover section is movable between an open configuration and a closed configuration and wherein when the first cover section is in the closed configuration, the first cover section substantially covers the opening.

14. A rail car cover system comprising:
 a rail car having an opening; and
 a first cover section operably attached to the rail car, wherein the first cover section comprises:
  a first corner hinge assembly pivotally mounted to the rail car;
  a second corner hinge assembly pivotally mounted to the rail car;
  at least one intermediate arm assembly pivotally mounted to the rail car intermediate the first corner hinge assembly and the second corner hinge assembly, wherein at least a portion of the at least one intermediate arm assembly is slidable away from the first corner hinge assembly; and
  a first cover material that is operably attached to the first corner hinge assembly, the second corner hinge assembly and the at least one intermediate arm assembly.

15. The rail car cover system of claim 14, wherein the at least one intermediate arm assembly comprises
 a first hinge portion attached to the rail car; and
 a second hinge portion that is slidable with respect to the first hinge portion, wherein the second hinge portion is attached to an arm that engages the first cover portion.

16. The rail car cover system of claim 15, wherein at least a portion of the first hinge portion has a first cylindrical section, wherein at least a portion of the second hinge portion has a second cylindrical section, and wherein the first cylindrical section has an outer diameter that is approximately the same as an inner diameter of the second cylindrical section.

17. The rail car cover system of claim 14, wherein at least a portion of the second corner hinge assembly is slidable away from the first corner hinge assembly.

18. The rail car cover system of claim 14, and further comprising a mechanical assist for moving the first cover section between an open configuration and a closed configuration.

19. The rail car cover system of claim 18, wherein the mechanical assist is a hydraulic actuator.

20. The rail car cover system of claim 18, and further comprising:
 a power system for operating the mechanical assist; and
 a control system for controlling the movement of the first cover section between the open configuration and the closed configuration, wherein the power system and the control system are each mounted on the rail car.

21. The rail car cover system of claim 14, wherein and further comprising a second cover section operably attached to the rail car, wherein the second cover section comprises:
 a third corner hinge assembly pivotally mounted to the rail car;
 a fourth corner hinge assembly pivotally mounted to the rail car and wherein at least a portion of the fourth corner hinge assembly is slidable away from the third corner hinge assembly; and
 a second cover material that is operably attached to the third corner hinge assembly and the fourth corner hinge assembly.

22. The rail car cover system of claim 14, wherein the first cover section is movable between an open configuration and a closed configuration and wherein when the first cover section is in the closed configuration, the first cover section substantially covers the opening.

23. A method of covering a rail car comprising:
 providing a rail car having an opening;
 pivotally attaching a first cover section to the rail car, wherein the first cover section comprises a first corner hinge assembly, a second corner hinge assembly and a first cover material, wherein the first corner hinge assembly and the second corner hinge assembly are pivotally mounted to the rail car and wherein first cover material is operably attached to the first corner hinge assembly and the second corner hinge assembly;

sliding at least a portion of the second corner hinge assembly away from the first corner hinge assembly;
pivoting the first cover section to an open configuration;
placing a product into the rail car; and
pivoting the first cover section to a closed configuration where the opening is substantially covered.

24. The method of claim 23, wherein the second corner hinge assembly further comprising a mounting mechanism comprising a first adjustment portion, a second adjustment portion and an adjustment mechanism, wherein the first adjustment portion is attached to the rail car, wherein the second adjustment portion is attached to an arm that engages the first cover portion and wherein the method further comprises:
sliding the second adjustment portion with respect to the first adjustment portion with the adjustment mechanism.

25. The method of claim 24, wherein the adjustment mechanism comprises a screw that operably connects the first adjustment portion and the second adjustment portion.

26. The method of claim 24, and further comprising retaining the first adjustment portion is a stationary position with respect to the second adjustment portion with a locking mechanism.

27. The method of claim 26, wherein the locking mechanism comprises at least one bolt that engages the first adjustment portion and the second adjustment portion.

28. The method of claim 23, and further comprising:
pivotally attaching at least one intermediate arm assembly pivotally mounted to the rail car intermediate the first corner hinge assembly and the second corner hinge assembly; and
sliding at least a portion of the first intermediate arm assembly is slidable away from the first corner hinge assembly.

29. The method of claim 23, and further comprising:
moving the first cover section between the open configuration and the closed configuration with a mechanical assist;
providing power to the mechanical assist with a power system; and
controlling movement of the first cover section between the open configuration and the closed configuration with a control system, wherein the power system and the control system are each mounted on the rail car.

30. The method of claim 23, and further comprising pivotally attaching a second cover section to the rail car, wherein when the first cover section and the second cover section are in the closed configuration, the first cover section and the second cover section substantially cover the opening.

* * * * *